(12) United States Patent
Park et al.

(10) Patent No.: US 11,516,541 B2
(45) Date of Patent: Nov. 29, 2022

(54) ELECTRONIC APPARATUS AND CONTROL METHOD THEREOF

(71) Applicant: SAMSUNG ELECTRONICS CO., LTD., Suwon-si (KR)

(72) Inventors: Junhyen Park, Suwon-si (KR); Jaehyun Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/993,796

(22) Filed: Aug. 14, 2020

(65) Prior Publication Data

US 2021/0067829 A1    Mar. 4, 2021

(30) Foreign Application Priority Data

Sep. 4, 2019  (KR) .................. 10-2019-0109484

(51) Int. Cl.
| | | |
|---|---|---|
| *H04N 7/167* | (2011.01) | |
| *H04N 7/16* | (2011.01) | |
| *H04N 21/4415* | (2011.01) | |
| *H04N 21/422* | (2011.01) | |
| *H04N 21/475* | (2011.01) | |

(52) U.S. Cl.
CPC ... *H04N 21/4415* (2013.01); *H04N 21/42203* (2013.01); *H04N 21/475* (2013.01)

(58) Field of Classification Search
CPC ......... H04N 21/4415; H04N 21/42203; H04N 21/475
See application file for complete search history.

(56) References Cited

U.S. PATENT DOCUMENTS

| | | | |
|---|---|---|---|
| 2006/0265595 A1 | 11/2006 | Scottodiluzio | |
| 2012/0072723 A1 | 3/2012 | Orsini et al. | |
| 2013/0262873 A1* | 10/2013 | Read ..................... | H04W 12/06 |
| | | | 713/186 |
| 2014/0143533 A1 | 5/2014 | Ganong, III et al. | |

(Continued)

FOREIGN PATENT DOCUMENTS

| | | |
|---|---|---|
| CA | 3 033 148 A1 | 2/2018 |
| KR | 10-2006-0123063 A | 12/2006 |

(Continued)

OTHER PUBLICATIONS

Communication dated Oct. 16, 2020 issued by the European Intellectual Property Office in counterpart European Application No. 20192495.8.

(Continued)

*Primary Examiner* — Kyu Chae
(74) *Attorney, Agent, or Firm* — Sughrue Mion, PLLC

(57) ABSTRACT

An electronic apparatus includes a communication interface, and a processor configured to encrypt data in each of a plurality of sections of voice data, the voice data corresponding to a first user voice signal, and control the communication interface to transmit the encrypted data to a server. The processor is further configured to obtain an authentication key based on data in a first section of the plurality of sections, encrypted data in the first section having been transmitted to the server, and encrypt data in a second section to be transmitted by using the authentication key.

16 Claims, 22 Drawing Sheets

(56) References Cited

U.S. PATENT DOCUMENTS

| | | | |
|---|---|---|---|
| 2015/0193776 A1* | 7/2015 | Douglas | G06Q 20/40145 |
| | | | 705/16 |
| 2016/0182231 A1 | 6/2016 | Fontecchio | |
| 2016/0211976 A1* | 7/2016 | Paris | G06F 21/6209 |
| 2016/0343389 A1* | 11/2016 | Chiou | G10L 25/57 |
| 2016/0359916 A1* | 12/2016 | Kim | H04L 63/123 |
| 2017/0374040 A1* | 12/2017 | Hua | H04L 63/0485 |
| 2018/0205707 A1* | 7/2018 | Bellala | H04L 9/085 |
| 2018/0350348 A1* | 12/2018 | Fukuda | G10L 21/003 |
| 2019/0172460 A1 | 6/2019 | Jin | |
| 2019/0182236 A1* | 6/2019 | Rangaraj | H04L 63/0442 |
| 2019/0251975 A1 | 8/2019 | Choi et al. | |
| 2019/0362712 A1* | 11/2019 | Karpukhin | G10L 15/22 |
| 2020/0034551 A1* | 1/2020 | Cantrell | G06F 21/32 |
| 2020/0374269 A1* | 11/2020 | Lidman | H04L 63/10 |
| 2021/0014039 A1* | 1/2021 | Zhang | G06N 3/084 |

FOREIGN PATENT DOCUMENTS

| | | |
|---|---|---|
| KR | 10-0791485 B1 | 1/2008 |
| WO | 2005/084160 A2 | 9/2005 |

OTHER PUBLICATIONS

Communication dated Nov. 13, 2020 issued by the International Searching Authority in counterpart Application No. PCT/KR2020/010405 (PCT/ISA/210 and PCT/ISA/237).

* cited by examiner

FIG. 14

| n | DATA<br>Pn | AUTHENTICATION<br>KEY<br>Kn | ENCRYPTION<br>(ELECTRONIC<br>APPARATUS)<br>Pn⊕Kn | DECRYPTION<br>(SERVER)<br>(Pn⊕Kn)⊕Kn |
|---|---|---|---|---|
| 1 | 0011 | 0110 | 0101 | 0011 |
| 2 | 0100 | 0011 | 0111 | 0100 |
| 3 | 0101 | 0100 | 0001 | 0101 |
| | | ... | | |

FIG. 15

| n | DATA | AUTHENTICATION KEY 1 | AUTHENTICATION KEY 2 | ENCRYPTION (ELECTRONIC APPARATUS) | DECRYPTION (SERVER) |
|---|---|---|---|---|---|
| | Pn | Kn1 | Kn2 | Pn⊕Kn | [{( Pn⊕Kn1 ) ⊕ Kn2} ⊕ Kn2] ⊕ Kn1 |
| 1 | 0011 | 0110 | 1000 | 1101 | 0011 |
| 2 | 0100 | 0011 | 1001 | 1110 | 0100 |
| 3 | 0101 | 0100 | 1010 | 1011 | 0101 |
| ⋮ | | | | | |

ELECTRONIC APPARATUS AND CONTROL METHOD THEREOF

CROSS-REFERENCE TO RELATED APPLICATION

This application is based on and claims priority under 35 U. S. C. § 119 to Korean Patent Application No. 10-2019-0109484, filed on Sep. 4, 2019, the disclosure of which is herein incorporated by reference in its entirety.

BACKGROUND

1. Field

The disclosure relates to an electronic apparatus and a control method thereof, and more particularly, to an electronic apparatus for configuring voice data as an authentication key and transmitting the configured voice data to a server, and a control method thereof.

2. Discussion of Related Art

Recently, an electronic apparatus capable of voice recognition is widely used, and security-critical technologies such as payment and authentication systems using the electronic apparatus have been developed. However, in the related art, voice data is first authenticated for security before the voice data is transmitted from the electronic apparatus to a server, and therefore, the voice data transmitted to the server is not verified. As a result, it is not possible to accurately check whether wrong data is transmitted to the server or any portion of the transmitted data is missing during transmission. Therefore, a hacking attempt using a voice signal through data interception can be made.

To solve this problem, technologies such as authentication of an electronic apparatus and a disposable password are used, but these technologies have a problem of additionally allocating modules and resources for security.

SUMMARY

One or more embodiments of the disclosure provide an electronic apparatus capable of ensuring integrity of voice data when transmitting the voice data from an electronic apparatus to a server, and a control method thereof.

According to an aspect of an embodiment, provided is an electronic apparatus, including: a communication interface; and a processor configured to encrypt data in each of a plurality of sections of voice data, the voice data corresponding to a first user voice input, and control the communication interface to transmit the encrypted data to a server, wherein the processor is further configured to obtain an authentication key based on data in a first section of the plurality of sections, encrypted data in the first section having been transmitted to the server, and encrypt data in a second section to be transmitted by using the authentication key.

Each of the plurality of sections may have a predefined time length.

The plurality of sections may be obtained by dividing the voice data according to at least one of a sentence, a phrase, a word, or a syllable included in the voice data.

The processor may be further configured to, by using an authentication key based on data in a third section, the third section being separate from the first section and encrypted data in the third section having been transmitted to the server, encrypt data in a fourth section, separate from the second section, to be transmitted.

An interval between the first section and the second section and an interval between the third section and the fourth section may be different from each other.

The first section and the second section may be adjacent to each other in the voice data.

The first section and the second section may be within a predefined time range.

The processor may be further configured to select the first section from among a plurality of first sections of which encrypted data have been transmitted to the server.

The processor may be further configured to receive information indicating the first section from the server through the communication interface, and obtain the authentication key based on the information indicating the first section.

The processor may be further configured to control the communication interface to transmit, to the server, information indicating the first section based on which the authentication key is obtained.

The processor may be further configured to control the communication interface to transmit, to the server, second voice data corresponding to a second user voice input, to perform user authentication, and encrypt the data in the first section by using a second authentication key, the second authentication key being based on data in a section of the second voice data.

The processor may be further configured to encrypt the data in the second section by using a plurality of authentication keys, the plurality of authentication keys being respectively based on data in a plurality of first sections, encrypted data of the plurality of first sections having been transmitted to the server.

According to an aspect of an embodiment, provided is a method of controlling an electronic apparatus, including: receiving a user voice input; encrypting data in each of a plurality of sections of voice data corresponding to the user voice input; and transmitting the encrypted data to a server, wherein the encrypting includes obtaining an authentication key based on data in a first section of the plurality of sections, encrypted data in the first section having been transmitted to the server, and encrypting data in a second section to be transmitted by using the authentication key.

Each of the plurality of sections may have a predefined time length.

The plurality of sections may be obtained by dividing the voice data according to at least one of a sentence, a phrase, a word, or a syllable included in the voice data.

The encrypting may further include encrypting, by using an authentication key based on data in a third section, the third section being separate from the first section and encrypted data in the third section having been transmitted to the server, encrypt data in a fourth section, separate from the second section, to be transmitted.

An interval between the first section and the second section and an interval between the third section and the fourth section may be different from each other.

The first section and the second section may be adjacent to each other in the voice data.

According to an aspect of an embodiment, provided is a server, including: a communication interface; and a processor configured to: receive, from an electronic apparatus via the communication interface, encrypted data in each of a plurality of sections of voice data, the voice data corresponding to a user voice; decrypt the received encrypted data; acquire a result of recognizing the user voice based on the decrypted data; and control the communication interface to transmit the acquired result to the electronic apparatus, wherein the processor is further configured to obtain an authentication key based on the received encrypted data in a first section of the plurality of sections and decrypt received encrypted data in a second section using the authentication key.

According to an aspect of an embodiment, provided is a non-transitory computer-readable recording medium storing a computer program, the computer program, when executable by at least one processor, causing the at least one processor to perform: receiving a user voice input; encrypting data in each of a plurality of sections of voice data corresponding to the user voice input; and transmitting the encrypted data to a server, wherein the encrypting includes obtaining an authentication key based on data in a first section of the plurality of sections, encrypted data in the first section having been transmitted to the server, and encrypting data in a second section to be transmitted by using the authentication key.

BRIEF DESCRIPTION OF THE DRAWINGS

The above and other aspects, features, and advantages of certain embodiments of the disclosure will be more apparent from the following description taken in conjunction with the accompanying drawings.

FIG. 14 is a diagram illustrating encryption and decryption algorithms according to an embodiment of the disclosure.

FIG. 15 is a diagram illustrating encryption and decryption algorithms according to an embodiment of the disclosure.

DETAILED DESCRIPTION

Figure 1:
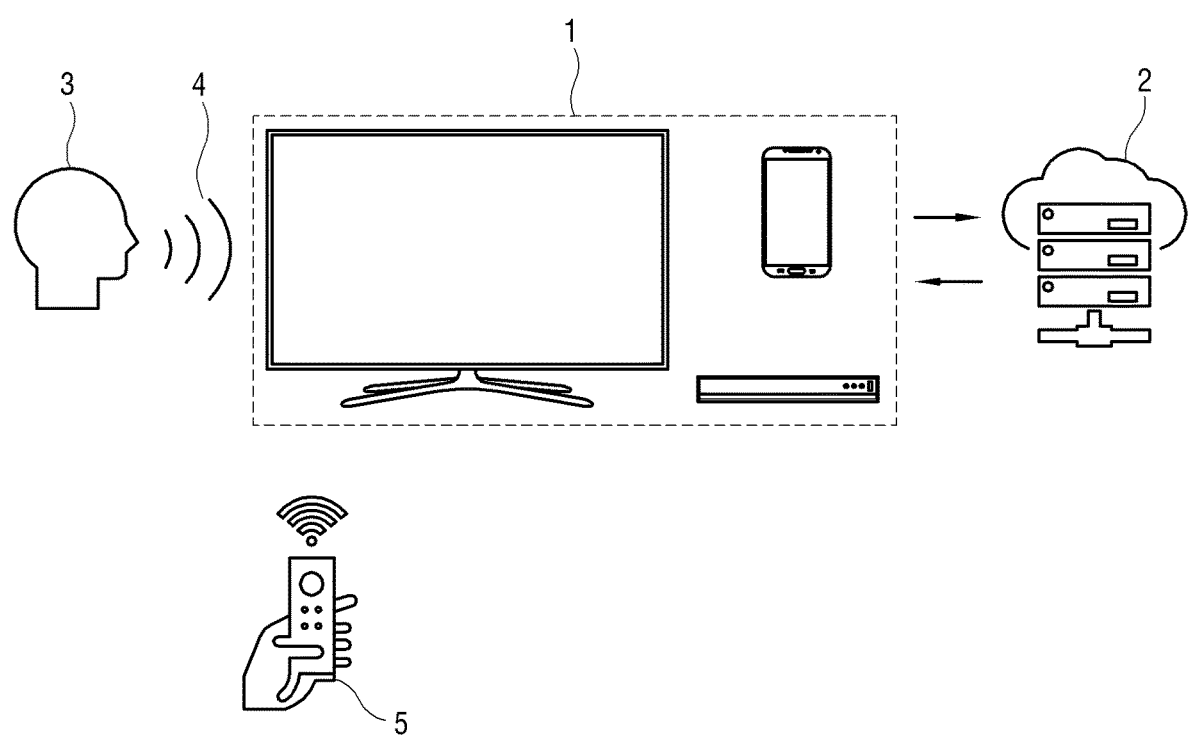
FIG. 1 illustrates an example of a system comprising an electronic apparatus and a server according to an embodiment of the disclosure.

Hereinafter, certain embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea of the disclosure and the core configuration and operation thereof are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'comprise', and 'have' do not preclude the existence or addition possibility of one or more other features or numbers, steps, operations, components, parts, or combinations thereof. In addition, in an embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

FIG. 1 illustrates an example of a system comprising an electronic apparatus and a server according to an embodiment of the disclosure. As illustrated in FIG. 1, an electronic apparatus 1 may be implemented as a display device that may display an image. As an example, the electronic apparatus 1 may comprise a television (TV), a computer, a smartphone, a tablet, a portable media player, a wearable device, a video wall, an electronic frame, and the like. In another example, the electronic apparatus 1 may be implemented as various types of devices, such as an image processing device such as a set-top box without a display, a household appliance such as a refrigerator and a washing machine, and an information processing device such as a computer body. Hereinafter, for convenience of explanation, it will be assumed on the assumption that the electronic apparatus 1 is implemented as a TV, but the electronic apparatus of the disclosure is not limited thereto and may be applied to various electronic apparatuses such as the set-top box other than the TV.

The electronic apparatus 1 may perform a voice recognition function. When receiving an uttered voice 4 (hereinafter, also referred to as a 'user voice') of a user 3, the electronic apparatus 1 obtains a voice signal for the uttered voice 4. In order to obtain a voice signal for the uttered voice 4, the electronic apparatus 1 may include a microphone 150 (see FIG. 2) configured to collect a uttered voice or may receive a voice signal from an external device such as a remote controller 5 having the microphone or a smartphone. The external device may be provided with a remote controller application to perform a function of controlling the electronic apparatus 1, a function of voice recognition, or the like. The external device in which such a remote controller application is installed may receive the uttered voice 4 of the user 3, and the external device may transmit control data using a TV, Wi-Fi, Bluetooth (BT), an infrared ray, and the like, and therefore a plurality of communication interfaces that may implement one or more of the above communication methods may be included in the electronic apparatus 1.

When obtaining the voice signal for the uttered voice 4, the electronic apparatus 1 may perform voice recognition processing on the obtained voice signal and perform an operation corresponding to recognition results by the voice recognition processing. The voice recognition processing includes a process of converting the voice signal into voice data (hereinafter, referred to as a 'voice data processing process'), and a process of identifying a command indicated by the voice data and performing an operation corresponding to the identified command (hereinafter, referred to as a 'command identification and execution process'). As an example, when the uttered voice 4 is "turn up a volume", the electronic apparatus 1 receives the uttered voice 4 and obtains the voice data for the voice signal of the uttered voice 4. Next, a command indicated by the obtained voice data is identified and the volume of the electronic apparatus 1 is increased according to the identified command. The content of the uttered voice 4 is not limited, and may include not only a simple control command as in the above example, but also a complex command having a high level of recognition required such as "pay for this content", "play my favorite movie". In this case, the voice data may be text data obtained through a speech-to-text (STT) process that converts the voice signal into text data.

The voice data processing process and the command identification and execution process of the voice recognition processing may all be executed in the electronic apparatus 1. Alternatively, since a system load and a storage capacity required for the electronic apparatus 1 are relatively large, at least some of the voice data processing process and the command identification and execution process may be performed by at least one server 2 communicatively connected to the electronic apparatus 1 through a network. For example, at least one server 2 may perform the voice data processing process, and the electronic apparatus 1 may perform the command identification and execution process. Alternatively, the at least one server 2 performs both the voice data processing process and the command identification and execution process, and the electronic apparatus 1 may only receive a result of the processes from the at least one server 2. The electronic apparatus 1 performs a specific function using data transmitted from the at least one server 2 to the electronic apparatus 1 or data converted by the electronic apparatus itself. The specific function may be performed by a processor 180 in the electronic apparatus. In another example, when an STT process is performed by a separate server, an STT server or a server other than the STT server may process and transmit information and/or data to the electronic apparatus 1, and the electronic apparatus 1 may perform the specific function based on the received information and/or data. In the disclosure, an implementation of an operation between the electronic apparatus 1 and the server 2 is mainly described, but an implementation of an operation between the electronic apparatus and other electronic apparatuses is also possible.

Figure 2:
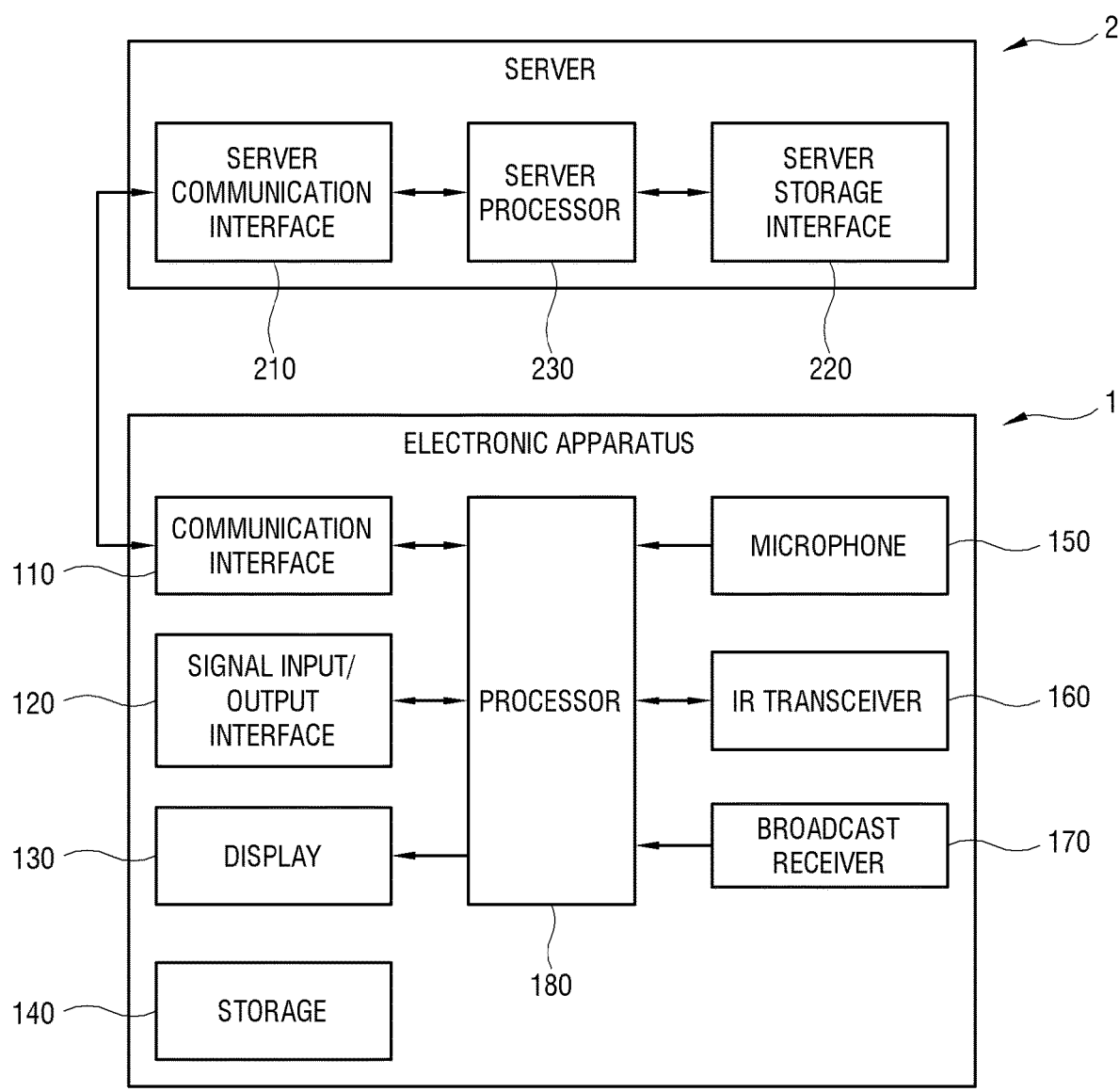
FIG. 2 is a block diagram illustrating a configuration of an electronic apparatus according to an embodiment of the disclosure.

FIG. 2 illustrates an example of a configuration of the electronic apparatus 1 and the server 2 in FIG. 1. As illustrated in FIG. 2, the electronic apparatus 1 includes a communication interface 110, a signal input/output interface 120, a display 130, a storage 140, the microphone 150, and an infrared (IR) transceiver (or IF transmitter/receiver) 160, a broadcast receiver 170, and the processor 180.

Hereinafter, the configuration of the electronic apparatus 1 will be described. Although an embodiment describes the case where the electronic apparatus 1 is a TV, the electronic apparatus 1 may be implemented as various types of devices, and therefore the embodiment does not limit the configuration of the electronic apparatus 1. There may be a possibility that the electronic apparatus 1 is not implemented as a display device, and in this case, the electronic apparatus 1 may not include components for displaying an image, such as the display 130. For example, when the electronic apparatus 1 is implemented as a set-top box, the electronic apparatus 1 may output an image signal or the like to a display device such as an external TV through the signal input/output interface 120.

The communication interface 110 is a bidirectional communication circuit that includes at least one of components such as communication modules and communication chips corresponding to various types of wired and wireless communication protocols. For example, the communication interface 110 is a local area network (LAN) card that is connected to a router or gateway through Ethernet in a wired manner, a wireless communication module that performs wireless communication with an access point (AP) according to a Wi-Fi protocol, a wireless communication module that performs one-to-one direct wireless communication such as Bluetooth, or the like. The communication interface 110 may communicate with the server 2 on the network to transmit and receive a data packet between the server 2 and the communication interface 110. Alternatively, the communication interface 110 may communicate with the remote controller 5 separated from a main body of the electronic apparatus 1 to receive a control signal transmitted from the remote controller 5.

As another embodiment, the communication interface 110 may be connected to external devices other than the server 2, receive video/audio data from the other external devices, and/or transmit video/audio data to the other external devices.

In this case, the communication interface (e.g., Ethernet modem, Wi-Fi module, and the like) that communicates with the server 2 and the communication interface (e.g., BT module) that communicates with the remote controller 5 may be different from each other, or the two communication interfaces may be the same (e.g., implemented as the Wi-Fi module).

When the microphone 150 provided in the electronic apparatus 1 receives a voice signal, the communication interface 110 converts the analog voice signal into a digital voice signal and transmits the digital voice signal to the processor 180. When a voice signal is received from an external device, the analog voice signal is converted into a digital voice signal by the external device, which is then transmitted to the communication interface 110 using data transmission communication such as BT or Wi-Fi.

As described above, the external device may be provided with the remote controller application to perform the function of controlling the electronic apparatus 1, the function of voice recognition, or the like. The external device in which such a remote controller application is installed may receive the uttered voice 4 of the user, and the external device may transmit and receive control data using Bluetooth (BT), Wi-Fi, an infrared ray, or the like, and therefore the plurality of communication interfaces 110 that may implement one or more of the above communication methods may be included in the electronic apparatus 1.

The signal input/output interface 120 is wired to a set-top box, an external device such as an optical media playback device, an external display device, a speaker, or the like in a 1:1 or 1:N (N is a natural number) manner to receive video/audio signals from the corresponding external device or output the video/audio signals to the corresponding external device. The signal input/output interface 120 includes a connector, a port, or the like according to a predetermined transmission standard, such as a high definition multimedia interface (HDMI) port, a display port, a digital visual interface (DVI) port, a thunderbolt, and a universal serial bus (USB) port. For example, the HDMI, the display port, the thunderbolt, and the like are the connectors or the ports through which video/audio signals may be transmitted simultaneously, and in another embodiment, the signal input/output interface 120 may include the connectors or the ports that transmit the video/audio signals separately.

The display 130 includes a display panel that may display an image on a screen. The display panel is provided as a light-receiving structure such as a liquid crystal type or a self-luminous structure such as an organic light emitting diode (OLED) type. The display 130 may further include additional components according to the structure of the display panel. For example, if the display panel is a liquid crystal type, the display 130 includes a liquid crystal display panel, a backlight unit that supplies light, and a panel driving substrate that drives a liquid crystal of the liquid crystal display panel.

The storage 140 stores digitized data. The storage 140 includes a nonvolatile storage that may preserve data regardless of whether the nonvolatile storage is supplied with power, and a volatile memory that may be loaded with data processed by the processor 180 and may not preserve data when the volatile memory is not supplied with power. The storage includes a flash-memory, a hard-disc drive (HDD), a solid-state drive (SSD) a read-only memory (ROM), and the like, and the memory includes a buffer, a random access memory (RAM), and the like.

The microphone 150 collects a sound of an external environment including a user utterance. The microphone 150 transmits a voice signal of the collected sound to the processor 180. The microphone 150 may be installed in a main body of the electronic apparatus 1 or may be installed in the remote controller 5 separate from the main body of the electronic apparatus 1. In the latter case, the voice signal from the microphone 150 is transmitted from the remote controller 5 to the communication interface 110.

The IR transceiver 160 may include at least one of a transmitting unit that transmits an IR signal to the external device and a receiving unit that receives the IR signal from the external device. For example, the IR transceiver 160 receives the IR signal from the remote controller 5, and the electronic apparatus 1 may operate based on a control command included in in the received IR signal. As another example, the electronic apparatus 1 may generate the IR signal including the control command, and transmit the generated IR signal to other external devices through the IR transceiver 160. As another example, the electronic apparatus 1 converts the IR signal received from the remote controller 5 into key codes corresponding to other external devices, and transmits the converted IR signal to the other external devices through the IR transceiver 160.

The broadcast receiver 170 may be implemented in various ways in correspondence with the standard of the received video signal and the implementation form of the electronic apparatus 1. For example, the broadcast receiver 170 may receive a video signal according to a composite video, a component video, a super video, Syndicat des Constructeurs d'Appareils Radiorécepteurs et Téléviseurs (SCART), a high definition multimedia interface (HDMI) standard, or the like in a wired manner, or may receive a radio frequency (RF) signal transmitted from a broadcast station in a wireless manner. Since the image signal is a broadcast signal, the broadcast receiver 170 includes a tuner that tunes the broadcast signal for each channel. The input signal may be input from the external device, and may be input from external devices such as a PC, an audio/video (AV) device, a TV, a smartphone, and a smart pad. In addition, the input signal may be generated from data received through a network such as the Internet. In this case, the broadcast receiver 170 may include a network communication interface that performs communication with the external devices.

The broadcast receiver 170 may use wired or wireless communication by a communication system. The wireless communication comprises radio frequency (RF), Zigbee, Bluetooth, Wi-Fi, ultra wideband (UWB), near field communication (NFC), and the like. The broadcast receiver 170 is built in the electronic apparatus 1 according to an embodiment, but may be implemented in the form of a dongle or a module and may be detached from the connector of the electronic apparatus 1. The broadcast receiver 170 receives a wired digital signal including a clock signal of a predetermined frequency (clock frequency) when a wired communication interface is used, and receives a wireless digital signal of a predetermined frequency (carrier frequency) when the wireless communication interface is used. The predetermined frequency signal (clock signal or carrier frequency signal) among the input signals input through the broadcast receiver 170 may be processed through a filter unit (or filter). The type of the input signal received from the broadcast receiver 170 is not limited, and for example, at least one of a wired digital signal, a wireless digital signal, and an analog signal may be received. Here, when receiving the analog signal, the broadcast receiver 170 may receive the input signal to which a predetermined frequency signal is added.

The processor 180 includes one or more hardware processors implemented as a central processing unit (CPU), a chipset, a buffer, a circuit, and the like that are mounted on a printed circuit board, and may be implemented as a system on chip (SOC) depending on a design method. The processor 180 includes modules corresponding to various processes such as a demultiplexer, a decoder, a scaler, an audio digital signal processor (DSP), and an amplifier when the electronic apparatus 1 is implemented as a display device. Here, some or all of these modules may be implemented as an SOC. For example, a module related to image processing such as a demultiplexer, a decoder, and a scaler may be implemented as an image processing SOC, and an audio DSP may be implemented as a separate chipset from the SOC.

The processor 180 converts the voice signal obtained by the microphone 150 or the like into the voice data, encrypts the converted voice data, and transmits the converted voice data to the server 2 through the communication interface 110. Thereafter, when the voice processing result is received from the server 2, a command indicated by the processed voice data is identified, and an operation is performed according to the identified command.

The processor 180 according to the disclosure may be implemented as software comprising one or more instructions stored in a storage medium readable by a machine such as the electronic apparatus 1. For example, the processor 180 of the electronic apparatus 1 may call and execute at least one command among one or more commands stored from the storage medium. This makes it possible for a device such as an electronic apparatus 1 to be operated to perform at least one function according to the at least one command called. The one or more instructions may include codes generated by a compiler or codes executable by an interpreter. The machine-readable storage medium may be provided in a form of a non-transitory storage medium. Here, the 'non-transitory' means that the storage medium is a tangible device, and does not include a signal only (for example, electromagnetic waves), and the term does not distinguish between the case where data is stored semi-permanently on a storage medium and the case where data is temporarily stored thereon.

For example, the control method of the electronic apparatus 1 according to the disclosure may be provided as being included in a computer program product. The computer program product may be traded as a product between a seller and a purchaser. The computer program product may be distributed in the form of a machine-readable storage medium (for example, compact disc (CD)-ROM), or may be distributed through an application store (for example, Play Store™) or may be directly distributed (for example, download or upload) between two user devices (for example, smartphones) online. In a case of online distribution, at least a portion of the computer program product may be at least temporarily stored in a storage medium such as a memory of a server of a manufacturer, a server of an application store, or a relay server or be temporarily generated.

Hereinafter, the configuration of the server 2 will be described. The server 2 may include a server communication interface 210, a server storage 220, and a server processor 230.

The server communication interface 210 is a bidirectional communication circuit that includes at least one of components such as communication modules and communication chips corresponding to various types of wired and wireless communication protocols. The server communication interface 210 supports communication standards corresponding to the communication interface 110 of the electronic apparatus 1, and various types of clients including the electronic apparatus 1 may communicate with each other through a network through a wide area network.

The server storage 220 performs operations such as reading, writing, modifying, deleting, and updating data by the server processor 230. The server storage 220 includes various nonvolatile memories and volatile memories such as a flash memory, a HDD, an SSD, a buffer, and a RAM. The server storage 220 of an embodiment includes one or more voice recognition engines for processing voice signals.

The server processor 230 includes one or more hardware processors 180 implemented as a CPU, a chipset, a buffer, a circuit, and the like that are mounted on a printed circuit board, and may be implemented as a system on chip (SOC) depending on a design method. The server processor 230 may perform various processes based on information received from the electronic apparatus 1. When receiving the encrypted voice data from the electronic apparatus 1, the server processor 230 according to an embodiment of the disclosure decrypts the received voice data. In addition, the server processor 230 stores an original text obtained by decryption in the server storage 220 and transmits the result obtained by processing the voice data to the electronic apparatus 1 through the server communication interface 210.

The processor 180 of the electronic apparatus 1 or the server processor 230 of the server 2 may encrypt or decrypt the obtained voice data and transmit the encrypted or decrypted voice data to the server 2 or the electronic apparatus 1, respectively, and perform at least a part of data analysis, processing, and result information generation for performing an operation for identifying a command according to the recognition result of the voice data using at least one of a machine learning, a neural network, or a deep learning algorithm as a rule-based or artificial intelligence algorithm.

For example, the processor 180 or the server processor 230 may perform functions of a learning unit and a recognition unit together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain learning data to generate the neural network. For example, the learning unit may obtain the learning data from the storage 140, which will be described in detail later, or from the outside. The learning data may be data used for learning the neural network, and the neural network may be trained using the data corresponding to the above-described operation as the learning data.

Before learning the neural network using the learning data, the learning unit may perform a pre-processing operation on the obtained learning data, or select data to be used for learning from among a plurality of learning data. For example, the learning unit may process the learning data in a predetermined format or filter the learning data, or add/remove noise to process data in a form suitable for learning. The learning unit may generate a neural network configured to perform the above-described operation using the pre-processed learning data.

The learned neural network may be constituted by a plurality of neural networks (or layers). The nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

In order to perform the above-described operation, the recognition unit may obtain target data. The target data may be obtained from the storage 140 or from the outside. The target data may be data to be recognized by the neural network. Before applying to the target data to the trained neural network, the recognition unit may perform the pre-processing operation on the obtained target data, or select data to be used for recognition from among a plurality of target data. For example, the recognition unit may process or filter the target data in a predetermined format, filter, or add/remove noise to process data in a form suitable for recognition. The recognition unit may obtain an output value output from the neural network by applying the preprocessed target data to the neural network. The recognition unit may obtain a probability value or a reliability value along with the output value.

Figure 3:
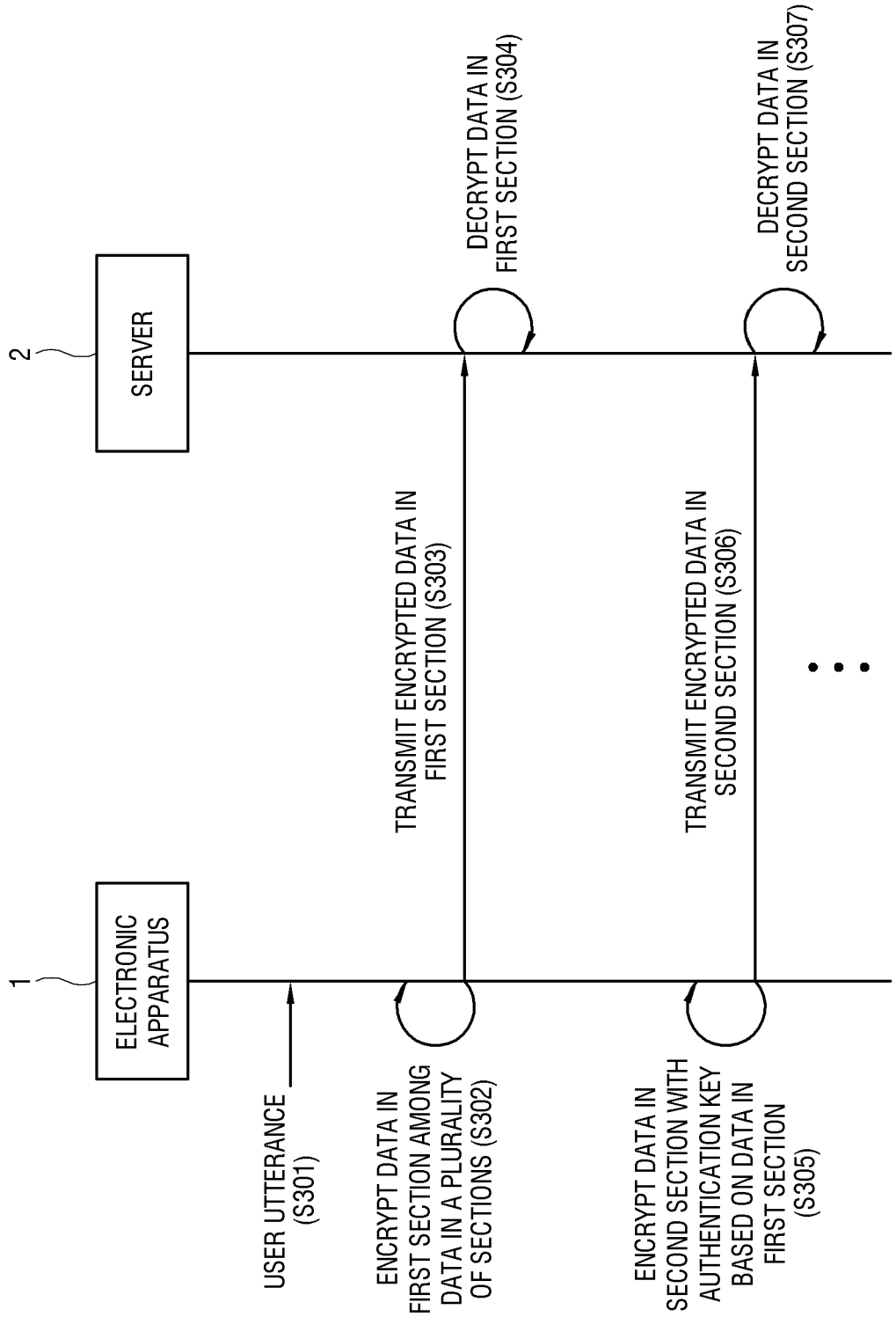
FIG. 3 is a diagram illustrating voice data transmission according to an embodiment of the disclosure.

FIG. 3 is a diagram illustrating voice data transmission according to an embodiment of the disclosure.

In the disclosure, the electronic apparatus 1 and the server 2 transmit/receive voice data through encryption and decryption. The encryption refers to a process of converting predetermined data into a cipher text using an encryption key, and the decryption refers to a process of restoring a cipher text to predetermined data using a decryption key.

Various encryption and decryption algorithms may be used in the disclosure, and examples of the encryption and decryption algorithms may include an advanced encryption standard (AES) method. The AES method is a 128-bit encryption algorithm, which is a symmetric key algorithm that uses the same key during the encryption and decryption process. The AES method is basically a method of analyzing symmetric key cryptography, which is excellent in terms of stability for linear cryptanalysis and differential cryptanalysis, computational efficiency related to processing speed and memory requirements, and implementation characteristics of algorithm related to flexibility and simplicity. However, in an embodiment, the AES method is described as a mere example of the encryption and decryption algorithm, and the encryption and decryption algorithm according to an embodiment of the disclosure is not limited thereto, and various encryption and decryption algorithms may be applied.

In the disclosure, the encryption and decryption are performed by using voice data. In the case of voice data having a plurality of sections, the voice data which is an authentication key used for encryption and decryption of each section may be the same or different. Hereinafter, the encryption key and the decryption key used for the encryption and decryption is referred to as the authentication key, and the encryption algorithm and the decryption algorithm will be described based on the assumption that the same authentication key is used for encryption and decryption.

When the user utters (S301), the communication interface 110 receives a voice signal for the uttered voice 4 from the microphone 150 or an external device such as, the remote controller 5 having the microphone, or the smartphone. When the communication interface 110 receives the voice signal for the uttered voice 4, the processor 180 of the electronic apparatus 1 performs voice recognition processing on the received voice signal. The processor 180 converts a voice signal into voice data during the voice recognition processing, and divides the converted voice data (420 in FIG. 4) into a plurality of sections to encrypt each section using a predetermined encryption algorithm (S302). Each section (410 in FIG. 4) has a predefined length of time (w in FIG. 4), or may be obtained by dividing voice data by at least one of a sentence, a phrase, a word, or a syllable of the uttered voice, but is not limited thereto.

The communication interface 110 transmits data in the encrypted section (first section) among the plurality of sections to the server communication interface 210 under the control of the processor 180 (S303). The server processor 230 decrypts the encrypted first section data received through the server communication interface 210 (S304). The server 2 may obtain an original text of the first section data through the decryption, and the server processor 230 controls to store the original text of the obtained voice data in the server storage 220. Next, the processor 180 sets the first section as an authentication key section, and encrypts data in a second section of the plurality of sections with an authentication key based on the set authentication key section (S305). That is, the encryption according to an embodiment of the disclosure sets a previous section (for example, first section) of a section (for example, second section) to be currently encrypted as an authentication key section, and encrypts data in the section to be currently processed with the authentication key based on the set authentication key section. The first section and the second section may be within a predefined time range. The first section and the second section in the disclosure may be adjacent to each other or may be separated from each other by a distance. The electronic apparatus 1 encrypts the data in the second section with the authentication key based on the first section and transmits the encrypted data to the server 2. When receiving the encrypted data in the second section, the server 2 decrypts the encrypted data using the decryption algorithm. Thereafter, the electronic apparatus 1 and the server 2 repeat this process until all of data is transmitted.

According to an embodiment of the disclosure, the electronic apparatus 1 and the server 2 divide the voice data based on the user's uttered voice into a plurality of sections to continuously perform the encryption and decryption of the voice data for each section. In this case, by setting a previous section of the section to be encrypted and decrypted as a section corresponding to the authentication key used for the encryption and decryption, it is possible to prevent hacking through insertion of other voice data during the transmission of the voice data, thereby ensuring the integrity of the voice data. Further, since the result of processing the transmitted voice signal is also used during the authentication, the method of using voice data according to an embodiment may also be used for a security-critical payment and/or authentication system.

Hereinafter, various examples of the encryption and decryption of voice data corresponding to an uttered voice according to the present embodiment will be described in more detail.

Figure 4:
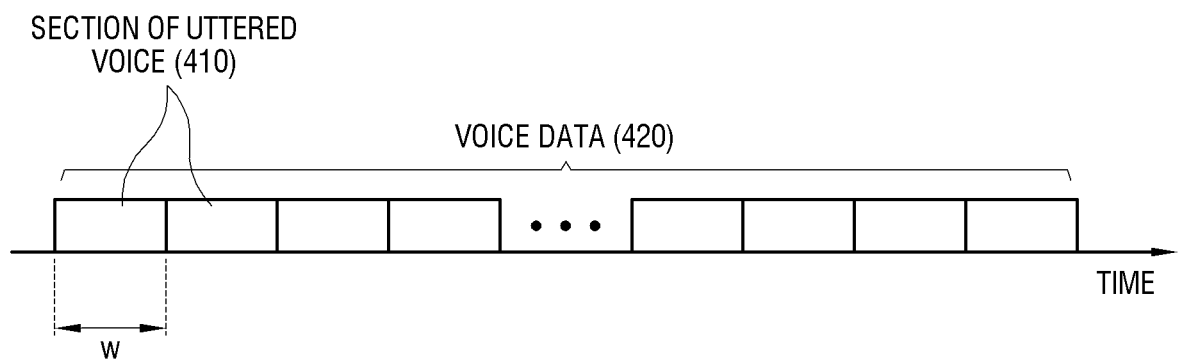
FIG. 4 is a diagram illustrating a voice data section according to an embodiment of the disclosure.

FIG. 4 is a diagram illustrating a voice data section according to an embodiment of the disclosure.

The uttered voice 4 according to an embodiment of the disclosure may be a meaningful unit command such as "turn up a volume", "play my favorite movie", and "pay for this content". Based on voice recognition processing on a voice signal of the uttered voice 4, the voice data 420 may be obtained.

The processor 180 of the electronic apparatus 1 divides and encrypts the voice data 420 into the plurality of sections, and each section 410 of the uttered voice may be of a predefined time length w, for example, approximately 20 ms to 30 ms. The processor 180 sequentially transmits data in each encrypted section to the server 2.

Figure 5:
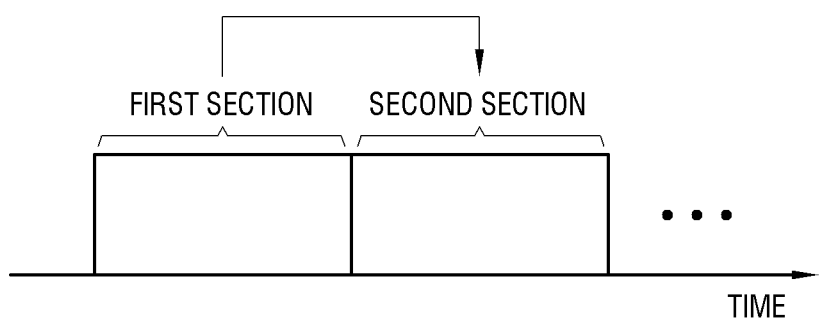
FIG. 5 is a diagram illustrating a voice data section according to an embodiment of the disclosure.

FIG. 5 is a diagram illustrating a voice data section according to an embodiment of the disclosure.

The processor 180 of the electronic apparatus 1 divides the voice data obtained by processing a user's uttered voice into the plurality of sections, and encrypts the data for each section and transmits the encrypted data to the server 2. In FIG. 5, when encrypting data, the processor 180 encrypts the data in the second section by using, as the authentication key, data in the first section which is the section transmitted immediately before the second section which is a section to be currently transmitted. In this case, since the second section and the first section that is used to encrypt the second section are connected (or immediately adjacent) to each other, the possibility that different data are inserted between the first section and the second section is lower than when the first section and the second section are separated from each other, so the data transmission is highly reliable.

Figure 6:
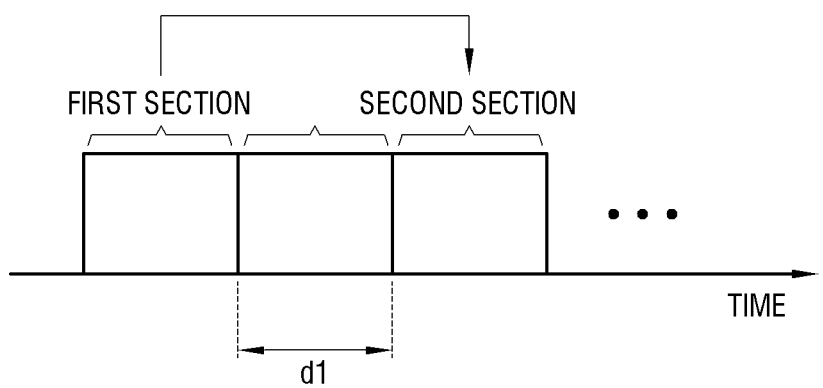
FIG. 6 is a diagram illustrating a voice data section according to an embodiment of the disclosure.
Figure 7:
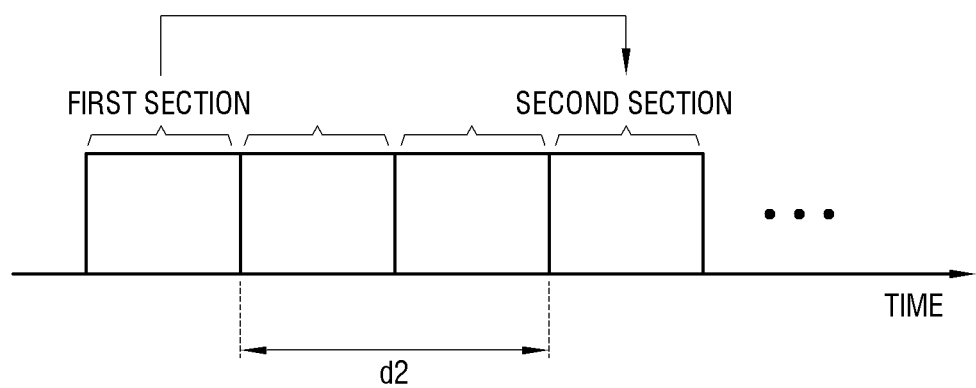
FIG. 7 is a diagram illustrating a voice data section according to an embodiment of the disclosure.
Figure 8:
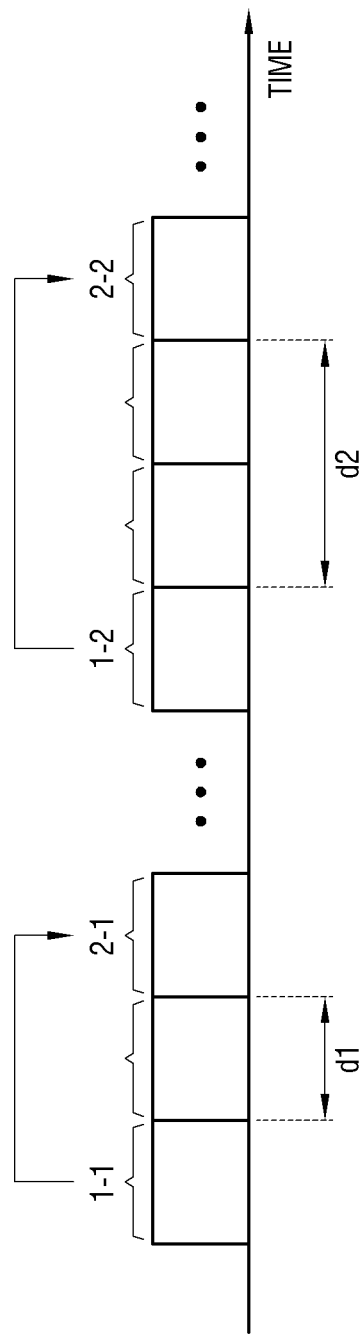
FIG. 8 is a diagram illustrating a voice data section according to an embodiment of the disclosure.

FIGS. 6 to 8 are diagrams illustrating a voice data section according to an embodiment of the disclosure.

According to an embodiment, the authentication key section may not necessarily be connected (or immediately adjacent) to the section to be currently transmitted. As illustrated in FIG. 6, the second section, which is a section to be currently transmitted, and the first section corresponding to the authentication key for encrypting the second section may be separated from each other. For example, a distance between the first section and the second section is a predefined distance d1 that may satisfy the reliability of encryption in encrypting the data in the second section, and may have a length of tens of ms corresponding to about one word in time, but is not limited thereto. For example, in embodiments of FIGS. 6 and 7, the distance d1 between the first section and the second section in FIG. 6 is different from the distance d2 between the first section and the second section.

The distance between subsequent sections (that is, an authentication key section and a section to be currently encrypted based on the authentication key) may be constant or different. In FIGS. 6 and 7, if the distance between the subsequent sections is constant, the distance d1 and the distance d2 are applied to the subsequent sections among a plurality of sections in FIGS. 6 and 7, respectively. When the encryption algorithm is a method in which a correlation between data in the subsequent sections is reflected, the closer the distance between the subsequent sections, the higher the encryption reliability is. The processor 180 may define a minimum distance between the subsequent sections at which the minimum reliability is guaranteed.

In an embodiment of FIG. 8, the processor 180 encrypts a section 2-1 with an authentication key that is based on a section 1-1 and encrypts section 2-2 with an authentication key that is based on a section 1-2. A distance between the sections 1-1 and 2-1 is d1, and a distance between sections 1-2 and 2-2 is d2, and the distance d1 may be different from the distance d2. When the distance between sections (that is, an authentication key section and a section to be currently encrypted based on the authentication key section) is not constant, it is impossible to predict which section is the authentication key section. Therefore, the insertion of other data in the transmitted data may be prevented, thereby ensuring the integrity of the transmitted data.

Figure 9:
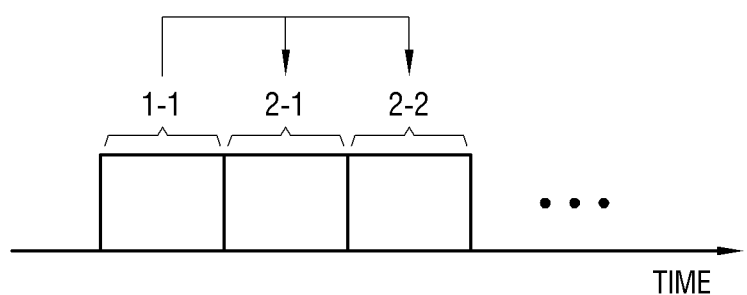
FIG. 9 is a diagram illustrating a voice data section according to an embodiment of the disclosure.

FIG. 9 is a diagram illustrating a voice data section according to an embodiment of the disclosure. In FIG. 9, the processor 180 may encrypt data in a plurality of second sections by selecting the authentication key based on data of one first section among the plurality of first sections that were previously transmitted. For example, the same previous section 1-1 is used as the authentication key section (the section on which the authentication is based on) to encrypt the sections 2-1 and 2-2. In this case, the same authentication key is used in transmitting the voice data having the plurality of sections, and therefore, a processing speed may increase.

Figure 10:
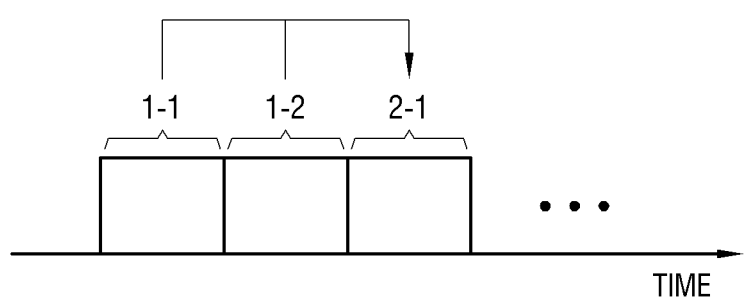
FIG. 10 is a diagram illustrating a voice data section according to an embodiment of the disclosure.

FIG. 10 is a diagram illustrating a voice data section according to an embodiment of the disclosure. FIG. 10 illustrates that data in one section is encrypted using a plurality of authentication keys based on data in the plurality of sections. For example, the processor 180 uses the plurality of authentication keys based on data of the sections 1-1 and 1-2 to encrypt the section 2-1. The sections 1-1 and 1-2 in an embodiment each correspond to any one of the plurality of first sections that have been previously transmitted. In this case, the plurality of previous sections are used as an authentication key section to encrypt data in one section to be currently encrypted, and as a result, an encryption strength is higher and the security is enhanced. The detailed description of this aspect of an embodiment will be described in detail again below.

Figure 11:
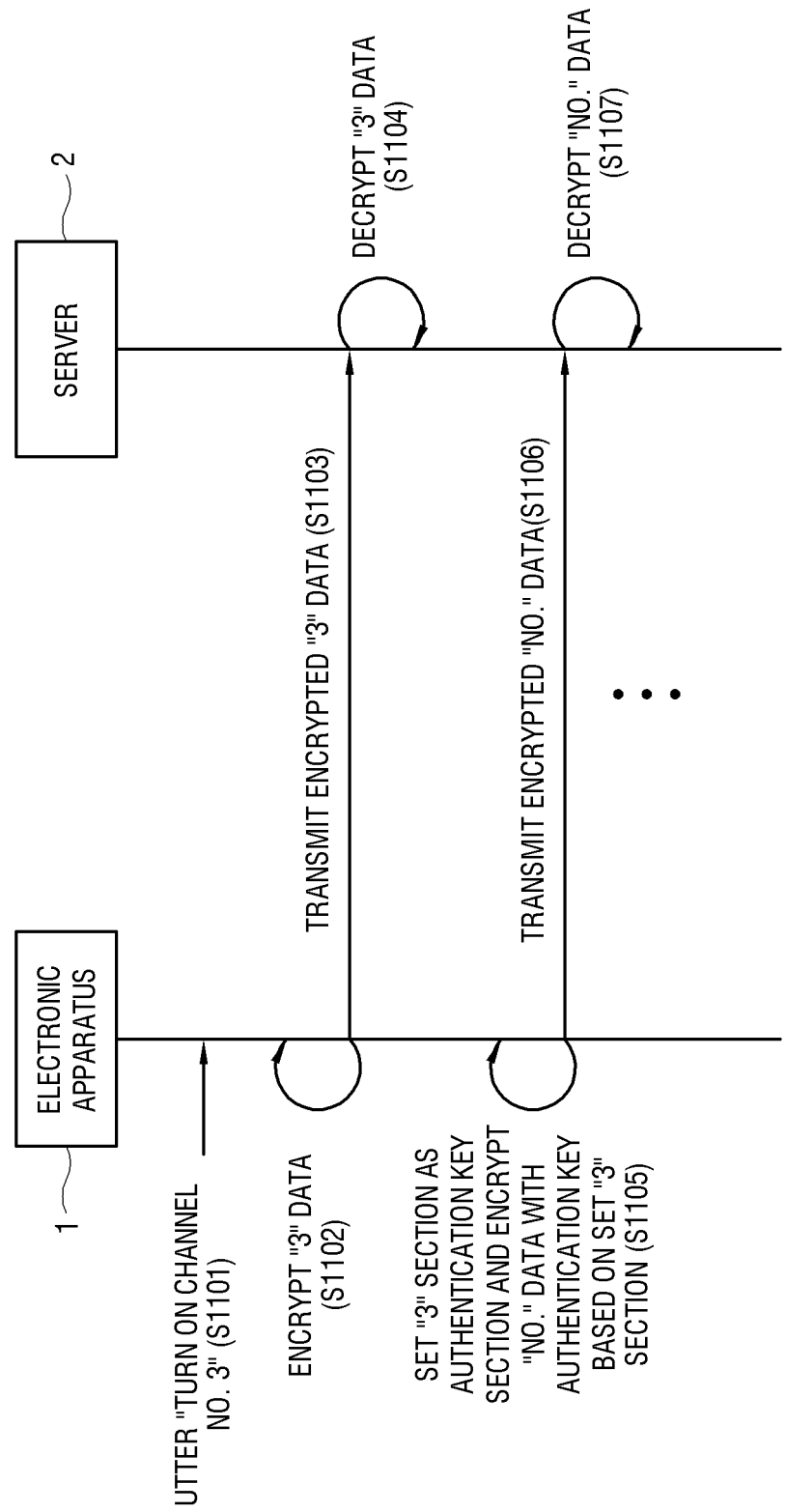
FIG. 11 is a diagram illustrating voice data transmission according to an embodiment of the disclosure.

FIG. 11 is a diagram illustrating a voice data transmission according to an embodiment of the disclosure.

When a user utters "turn on channel No. 3" (S1101), the communication interface 110 of the electronic apparatus 1 receives a voice signal for the uttered voice, and the processor 180 performs voice recognition processing on the received voice signal. The processor 180 converts the voice signal into the voice data during the voice recognition process. The processor 180 divides the converted voice data into, for example, a plurality of sections in units of syllables or words, and encrypts voice data of a section corresponding to "3" in the uttered voice (hereinafter, referred to as a "3" section) among the plurality of sections (S1102). Then, when the encrypted "3" data is transmitted to the server (S1103), the server processor 230 decrypts the encrypted "3" data (S1104) to obtain the "3" data, and store the obtained "3" data in the server storage 220. The processor 180 sets the "3" section as an authentication key section, and encrypts data in the next section corresponding to "No." in the uttered voice (hereinafter, referred to as a "No." section) by using the authentication key that is based on the set "3" section (S1105). Then, when the encrypted "No." data is transmitted to the server (S1106), the server processor 230 decrypts the encrypted "No." data (S1107) to obtain the "No." data, and store the obtained "No." data in the server storage 220. The electronic apparatus 1 and the server 2 according to an embodiment of the disclosure repeat the above process until the "turn on channel No. 3" uttered by the user are completely transmitted.

Although an embodiment illustrates the case where the first section and the second section are connected (or immediately adjacent) to each other, the embodiment is not limited thereto, and various methods of selecting a section (the first section or the authentication key section) illustrated in FIGS. 6 to 10 may also be applied in the embodiment. Also, although it is described that the processor 180 divides voice data of a plurality of sections into syllables, the embodiment is not limited thereto.

Figure 12:
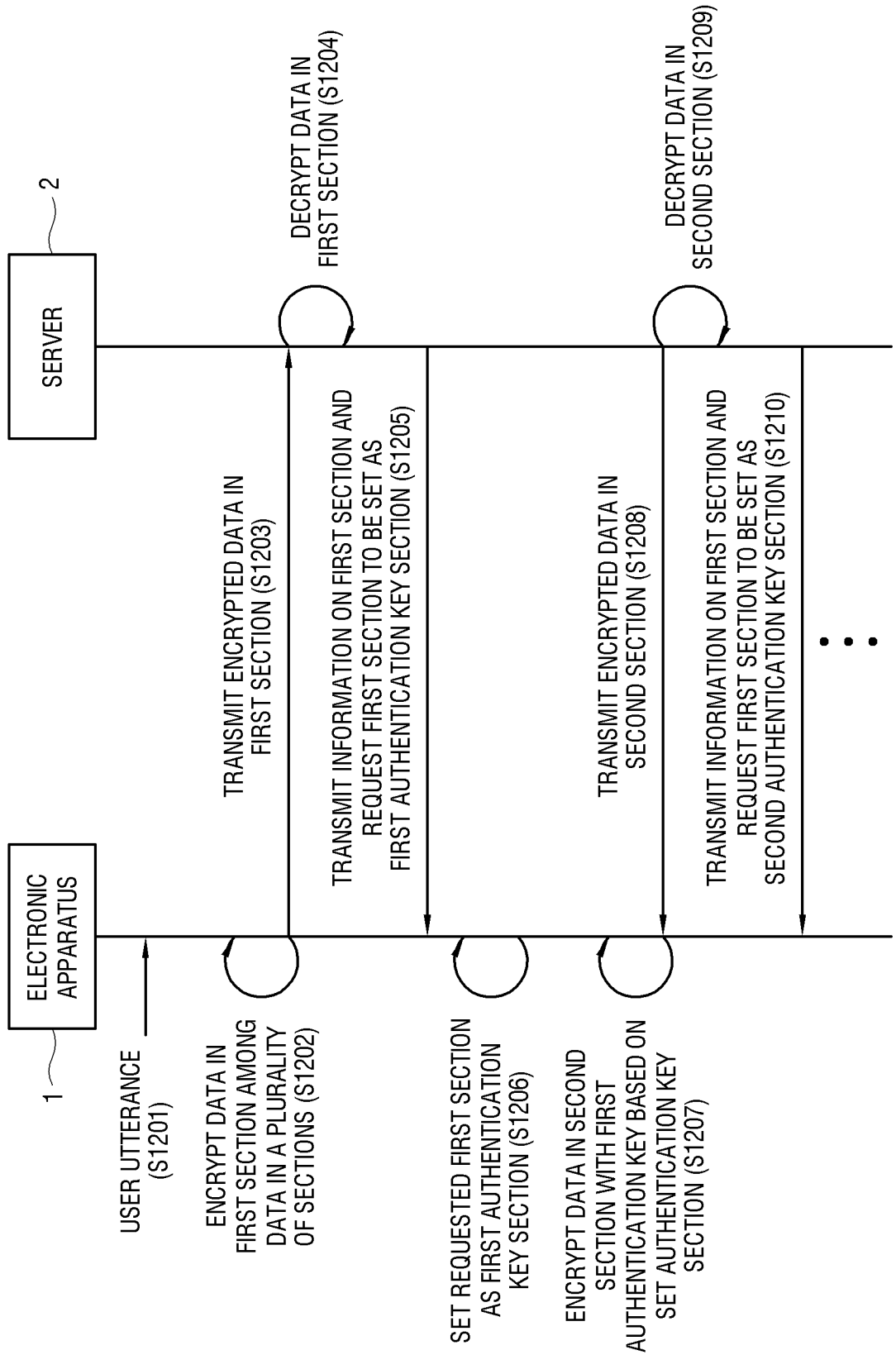
FIG. 12 is a diagram illustrating voice data transmission according to an embodiment of the disclosure.

FIG. 12 is a diagram illustrating voice data transmission according to an embodiment of the disclosure. In an embodiment, the first section to be used as the authentication key section may be variously selected, such as a section that is transmitted immediately before the section to be currently transmitted or a section separated by a predefined distance that may satisfy the reliability of encryption in the section to be currently transmitted, from among the plurality of first sections that are previously transmitted as described in FIGS. 5 to 10. For example, the first section to be used as the authentication key section is predefined, and the electronic apparatus 1 and the server 2 may operate by sharing information on the predefined first section. As another embodiment, the first section to be used as the authentication key section may be set during operation, and either the electronic apparatus 1 or the server 2 may set the first section.

When the user utters (S1201), the communication interface 110 of the electronic apparatus 1 receives the voice signal for the uttered voice, and the processor 180 performs the voice recognition processing on the received voice signal. The processor 180 converts the voice signal into the voice data during the voice recognition processing, and divides the voice data into a plurality of sections to encrypt voice data in a first section of the plurality of sections (S1202). Then, when the encrypted data in the first section is transmitted to the server (S1203), the server processor 230 decrypts the encrypted data in the first section (S1204) to obtain the data in the first section and store the obtained data in the server storage 220. The server processor 230 selects any one of the plurality of first sections pre-stored in the server storage 220 as a first authentication key section and requests the selected first section to be set as the first authentication key section while transmitting information about the selected first section to the electronic apparatus 1 (S1205). The processor 180 sets the selected first section as the first authentication key section (S1206), and encrypts data in the second section by using the first authentication key that is set based on the set first section (S1207). Then, when the encrypted data in the second section is transmitted to the server (S1208), the server processor 230 decrypts the encrypted data in the second section by using the first authentication key (S1209) to obtain the data in the second section and transmit the obtained data to the server storage 220. The server processor 230 selects any one of the plurality of first sections pre-stored in the server storage 220 as a second authentication key section and requests the selected first section to be set as the second authentication key section while transmitting information about the selected first section to the electronic apparatus (S1210). Since the server 2 has a memory capacity larger than that of the electronic apparatus 1, various algorithms for selecting any one of the plurality of first sections may exist. Since encryption is complicated by using various algorithms, security may be further enhanced. In addition, this will not affect the data processing speed.

Figure 13:
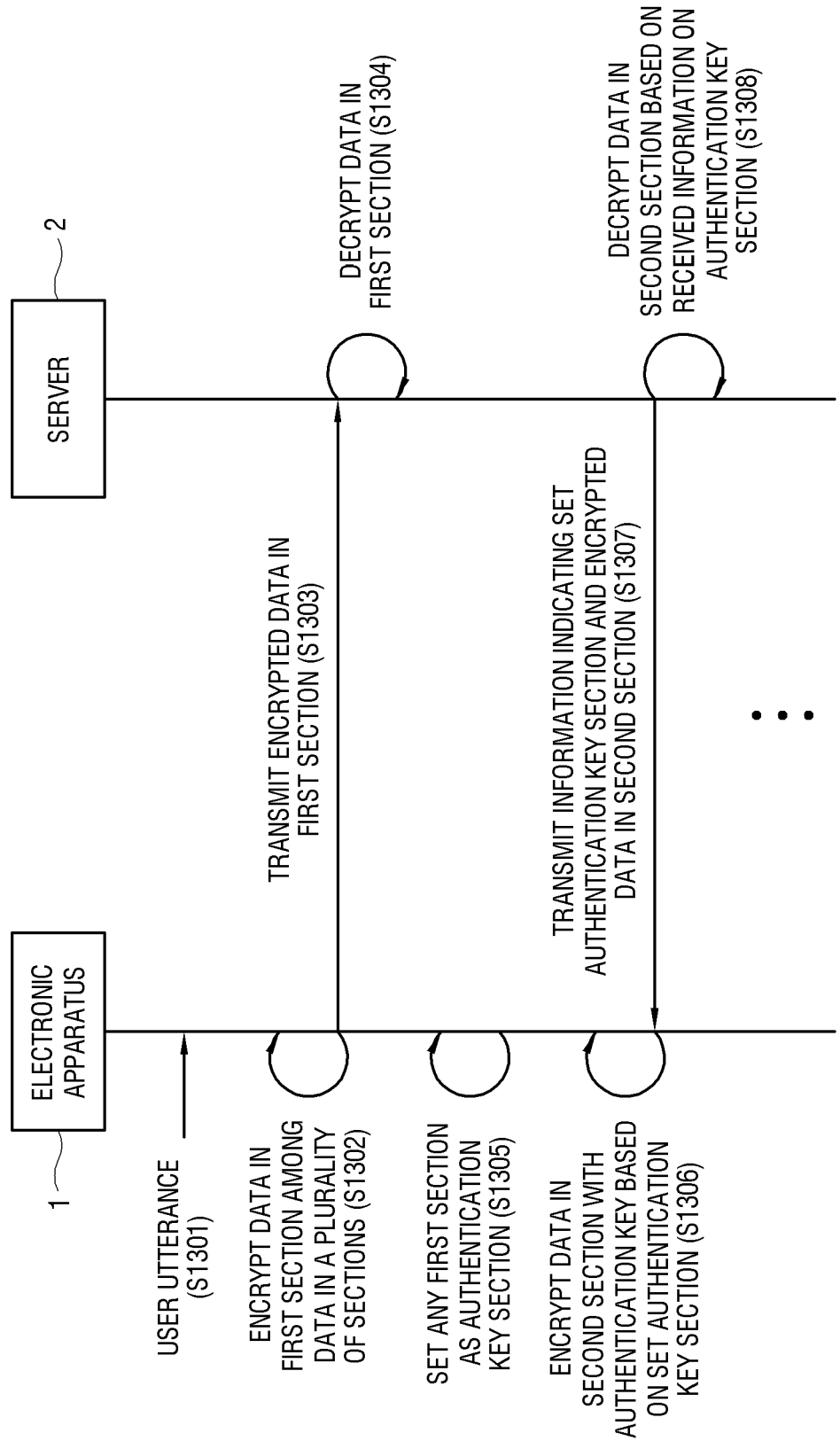
FIG. 13 is a diagram illustrating voice data transmission according to an embodiment of the disclosure.

FIG. 13 is a diagram illustrating voice data transmission according to an embodiment of the disclosure. In an embodiment, the processor 180 may select any one of the plurality of first sections that have been previously transmitted as an authentication key section, and transmit to the server information on the selected first section along with the data encrypted by using the selected first section.

When the user utters (S1301), the communication interface 110 of the electronic apparatus 1 receives the voice signal for the uttered voice, and the processor 180 performs the voice recognition processing on the received voice signal. The processor 180 converts the voice signal into the voice data in the voice recognition processing, and divides the voice data into a plurality of sections to encrypt voice data in a first section of the plurality of sections (S1302). Then, when the encrypted data in the first section is transmitted to the server (S1303), the server processor 230 decrypts the encrypted data in the first section (S1304) to obtain the data in the first section and store the obtained data in the server storage 220. The processor 180 sets any first section as the authentication key section (S1305), and encrypts the data in the second section by using the authentication key based on the set authentication key section (S1306). Then, when information indicating the encrypted data in the second section and the set authentication key section is transmitted to the server (S1307), the server processor 230 decrypts the encrypted data in the second section based on the received information indicating the set authentication key section (S1308). The electronic apparatus 1 and the server 2 according to an embodiment of the disclosure repeat this process until all of voice data is transmitted. In this case, even if the electronic apparatus 1 sets any first section as the authentication key section, the server 2 may receive the information indicating the authentication key section to decrypt the encrypted data in the first section. In an embodiment, the electronic apparatus 1 selects the authentication key section, and also transmits information on the selected authentication key section to the server 2, so that the server 2 may easily perform decryption using the received information.

FIG. 14 is a diagram illustrating encryption and decryption algorithms according to an embodiment of the disclosure. According to an embodiment, the processor 180 divides data into each section (P1, P2, P3, and the like), and encrypts each section with each corresponding authentication key (K1, K2, K3, and the like) (Pn⊕Kn) based on an algorithm to be described later. The server processor 230 decrypts each encrypted data with each corresponding authentication key (K1, K2, K3, and the like) ((Pn⊕Kn) ⊕Kn).

FIG. 14 illustrates encryption and decryption algorithms according to an exclusive OR. The exclusive OR is a logical operation that determines if only one of the two propositions is true. When data to be transmitted is Pn (hereinafter, n is a natural number) and an authentication key corresponding to the data Pn is Kn, if the data Pn is encrypted with the authentication key Kn using an exclusive logical operation, encrypted data Pn becomes Pn⊕ Kn. When the encrypted data Pn⊕Kn is decrypted with the authentication key Kn, the decrypted data Pn becomes (Pn⊕Kn)⊕Kn, which becomes an original text Pn. For example, as illustrated in FIG. 14, it is assumed that each section of voice data having a plurality of sections is represented by a four-digit binary number, and data P1 in a first section is 0011. An authentication key K1 based on an authentication key section for encrypting the first section is 0110, and when the data P1 0011 is encrypted based on the logical operation Pn⊕Kn, data 0101 is obtained. When the data 0101 is decrypted with the authentication key K1 based on the logical operation (Pn⊕Kn) ⊕Kn, the original data P1, that is, 0011 is obtained. In an embodiment of FIG. 14, each section to be encrypted and a section on which each authentication key for encrypting and decrypting the section is based are connected (or immediately adjacent) to each other. Accordingly, when data P2 in the second section next to the first section is 0100, the data P1 0011 in the first section obtained by decrypting immediately before the second section is configured as an authentication key K2. When the data 0100 in the second section that is P2 is encrypted with the configured authentication key K2 0011, data 0111 is obtained, and when the 0111 is decrypted with the authentication key K2 0011, the original data P2, that is, 0100 is obtained. Similarly, if data P3 in a next section connected to the second section is 0101, the data P2 0100 in the second section obtained by decrypting immediately before the next section is configured as an authentication key K3. When the data 0101 in the section that is P3 is encrypted with the configured authentication key K3 0100, data 0001 is obtained, and when the data 0001 is decrypted with the authentication key K3 0100, the original data P3, that is, 0101 is obtained. In this manner, each section may be transmitted through the encryption and decryption.

FIG. 15 is a diagram illustrating encryption and decryption algorithms according to an embodiment of the disclosure. FIG. 15 illustrates transmission of data through the encryption and decryption according to the exclusive OR using a plurality of authentication keys, unlike FIG. 14. According to an embodiment, the processor 180 divides data into each section (P1, P2, P3, and the like), and encrypts each section with each corresponding authentication key (K11, K21, K31, and the like) (Pn⊕Kn1). Then, the processor 180 encrypts the encrypted data with another authentication key (K12, K22, K32, and the like) once more ((Pn⊕Kn1)⊕Kn2)). The server processor 230 decrypts the encrypted data ((Pn⊕Kn1)⊕Kn2)) with the plurality of authentication keys that were used in encryption in a reverse order of encryption ([{(Pn⊕Kn1)⊕Kn2}⊕Kn2]⊕Kn1).

When the data Pn (hereinafter, n is a natural number) to be transmitted sequentially is encrypted using the authentication keys Kn1 and Kn2 based on the exclusive logical operation, the data Pn becomes (Pn⊕Kn1)⊕Kn2. When decrypting, the data is decrypted in the reverse order of Kn2 and Kn1, and the original text Pn is obtained based on the logical operation [{(Pn⊕Kn1)⊕Kn2}⊕Kn2]⊕Kn1. For example, as illustrated in FIG. 14, it is assumed that each section of voice data having a plurality of sections is represented by a four-digit binary number, and the data P1 in a first section is 0011. Authentication keys K11 and K12 based on corresponding authentication key sections for encrypting the first section are 0110 and 1000, respectively, and when the data P1 0011 are encrypted based on the logical operation (Pn⊕Kn1)⊕Kn2, data 1101 is obtained. When the data 1101 is decrypted using the authentication keys K11 and K12 based on the logical operation [{(Pn⊕Kn1)⊕Kn2}⊕Kn2]⊕Kn1, the original data P1, that is, 0011 is obtained. In an embodiment of FIG. 15, each section to be encrypted and a section on which each authentication key for encrypting and decrypting the section is based are connected to each other. Accordingly, when data P2 in the second section connected to the first section is 0100, the data P1 0011 in the first section obtained by decrypting immediately before the second section is configured as an authentication key K21. When the data 0100 in the second section that is P2 is encrypted with the configured authentication key K21 0011 and an authentication key K22 1001, data 1110 is obtained, and when the data 1110 is decrypted with the authentication keys K21 0011 and K22 1001, the original data P2, that is, 0100 is obtained. Similarly, if the data P3 in the next section connected to the second section is 0101, the data P2 0100 in the second section obtained by decrypting immediately before the next section is configured as an authentication key K31. When the data P3 0101 in the third section is encrypted with the configured authentication key K31 0100 and an authentication key K32 1010, data 1011 is obtained, and when the data 1011 is decrypted with the authentication keys K31 0100 and K32 1010, the original data P3, that is, 0101 is obtained. As such, each section may be sequentially transmitted through the encryption and decryption.

According to an embodiment of the disclosure, security is further enhanced because a plurality of authentication keys are used when encrypting and decrypting data in one section. The encryption and decryption algorithms according to an embodiment are not limited to the exclusive OR. In addition, in order to further enhance security, an algorithm that encrypts and decrypts data by reflecting data relevance between the first section and the second section is also possible.

Figure 16:
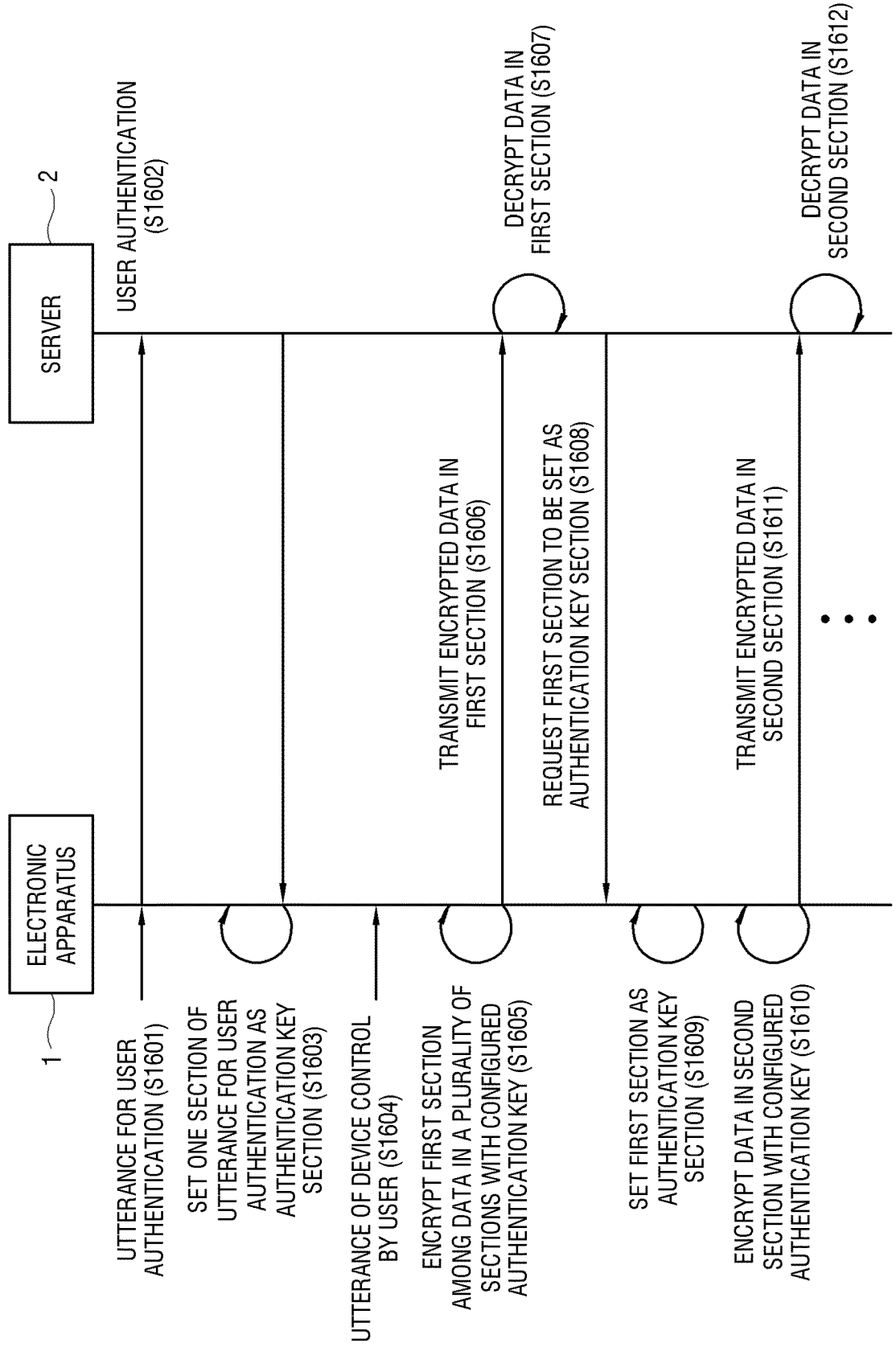
FIG. 16 is a diagram illustrating voice data transmission according to an embodiment of the disclosure.

FIG. 16 is a diagram illustrating voice data transmission according to an embodiment of the disclosure.

In an embodiment, when a user utters, a method of converting, by the processor 180, voice data, dividing the voice data into a plurality of sections, and selecting an authentication key to be used for encryption of a first section is performed.

The data transmission between the electronic apparatus 1 and the server 2 according to an embodiment further includes a user authentication operation. The user may perform an operation of authenticating that the user has the right to use the electronic apparatus 1 before issuing a command to control the electronic apparatus 1 through utterance. When the user utters for user authentication (S1601), the communication interface 110 of the electronic apparatus 1 receives the voice signal for the uttered voice, and the processor 180 of the electronic apparatus 1 performs the voice recognition processing on the received voice signal. The processor 180 converts the voice signal into the voice data during the voice recognition process. The converted voice data is transmitted to the server 2, and the server processor 230 authenticates the user through the transmitted voice data (S1602). When the server 2 successfully completes the user authentication, the electronic apparatus 1 sets one section of utterance for the user authentication as an authentication key section (S1603). For example, the authentication key section of an embodiment may be the last section among a plurality of sections of utterance for the user authentication. Then, when the user performs an utterance (hereinafter, referred to as a 'second utterance') for controlling the electronic apparatus 1 (S1604), the processor 180 encrypts a first section of voice data of a second utterance using an authentication key based on voice data corresponding to the previously set authentication key section (S1605).

Hereinafter, the electronic apparatus 1 and the server 2 according to an embodiment of the disclosure repeat the encryption/decryption process described with reference to FIGS. 1 to 16 until all of voice data is transmitted. According to an embodiment of FIG. 16, the user authentication needs to be first performed as the data of the uttered voice for the user authentication is used as the authentication key, and therefore, the reliability of authentication may be improved.

Figure 17:
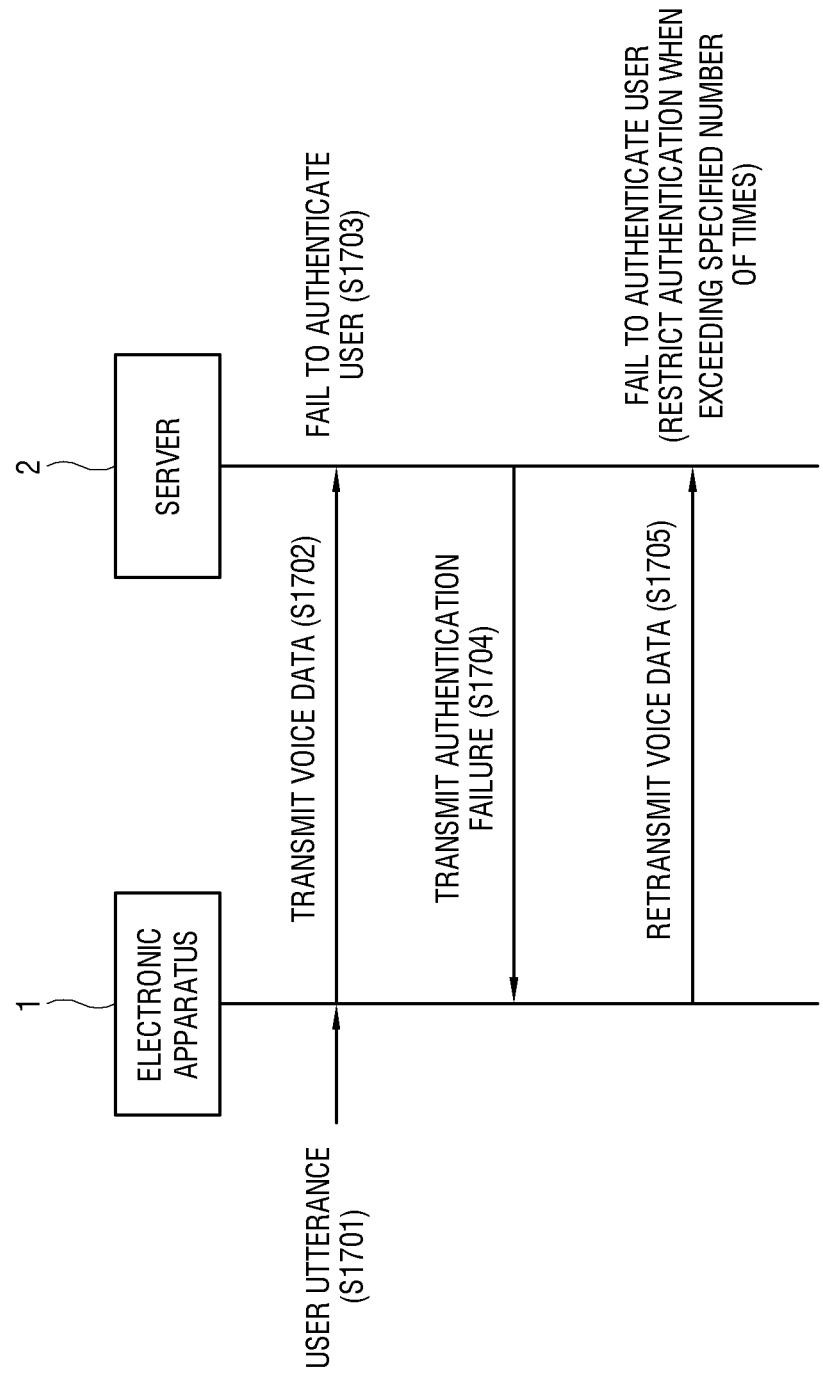
FIG. 17 is a diagram illustrating voice data transmission according to an embodiment of the disclosure.

FIG. 17 is a diagram illustrating voice data transmission according to an embodiment of the disclosure. FIG. 17 illustrates a case where the user authentication using an utterance of a user fails. First, it is assumed that the user utters (S1701), and voice data based on the user utterance is transmitted to the server 2 (S1702), and the user authentication by the server 2 fails (S1703). In this case, the server 2 transmits to the electronic apparatus 1 information that authentication has failed (S1704). The electronic apparatus 1 that receives authentication failure information retransmits the voice data to the server 2 (S1705), and if the server 2 that receives the voice data again fails to authenticate the user (S1706), the server 2 may end the authentication operation when the server 2 fails to authenticate the user over a specified number of times.

Figure 18:
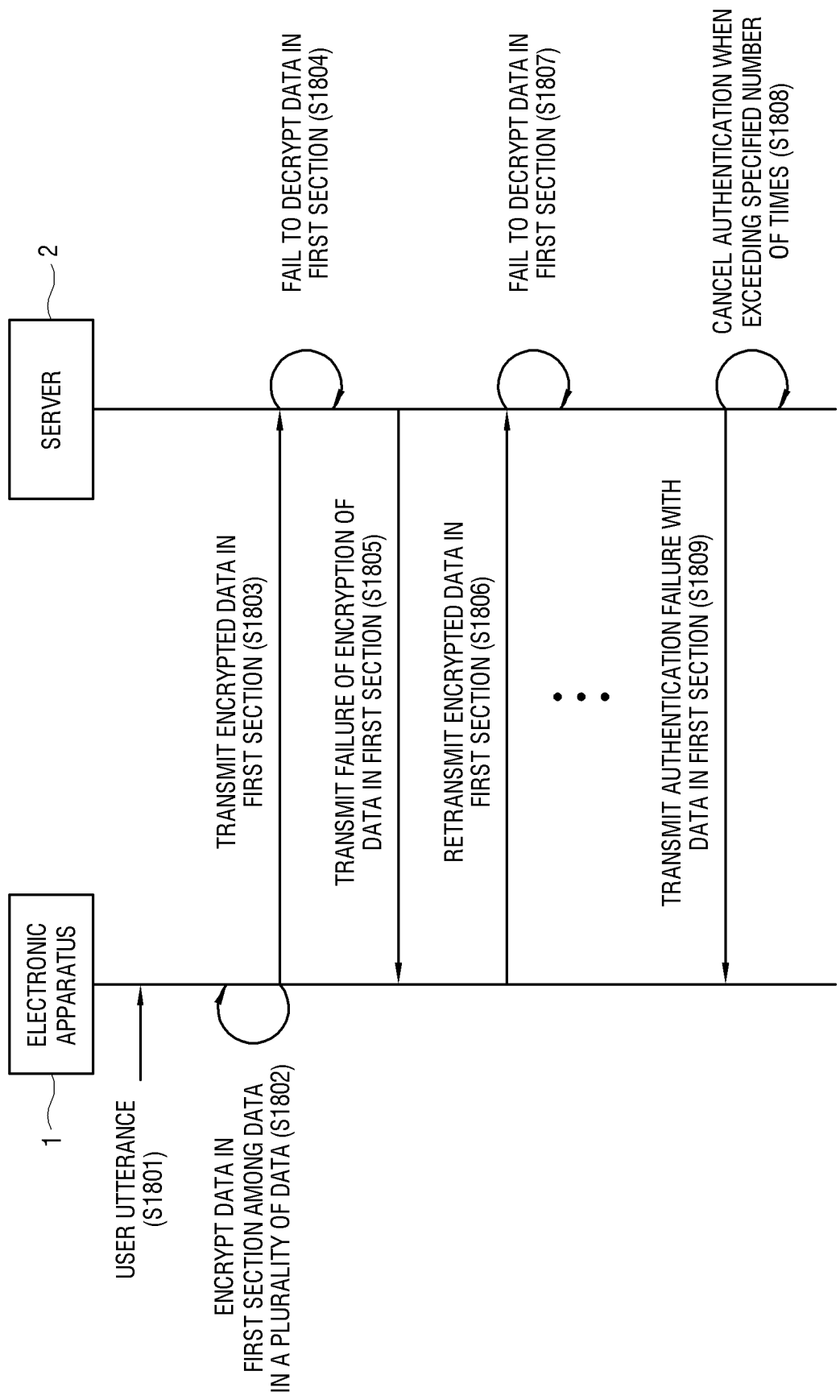
FIG. 18 is a diagram illustrating voice data transmission according to an embodiment of the disclosure.

FIG. 18 is a diagram illustrating voice data transmission according to an embodiment of the disclosure. FIG. 18 illustrates a case where decryption fails due to an authentication key error according to an embodiment of the disclosure.

When the user utters (S1801), the communication interface 110 of the electronic apparatus 1 receives the voice signal for the uttered voice, and the processor 180 performs the voice recognition processing on the received voice signal. The processor 180 converts the voice signal into the voice data during the voice recognition processing, and divides the voice data into a plurality of sections to encrypt voice data in a first section of the plurality of sections (S1802). Then, it is assumed that the server processor 230 decrypts the encrypted data in the first section by transmitting the encrypted data in the first section to the server 2 (S1803), but decryption fails due to the authentication key error (S1804). In this case, the server 2 transmits to the electronic apparatus 1 information that the encrypted data in the first section has failed to be decrypted (S1805). The electronic apparatus 1, which has received decryption failure information, retransmits the encrypted data in the first section to the server 2 (S1806), and the server 2, which receives the encrypted data again, retries to decrypt the encrypted data. However, the server 2 again fails to decrypt the data in the first section (S1807) and the server 2 may cancel the authentication when the failure exceeds a specified number of times (S1808). The server 2 transmits to the electronic device that the authentication has failed with the data in the first section (S1809).

Figure 19:
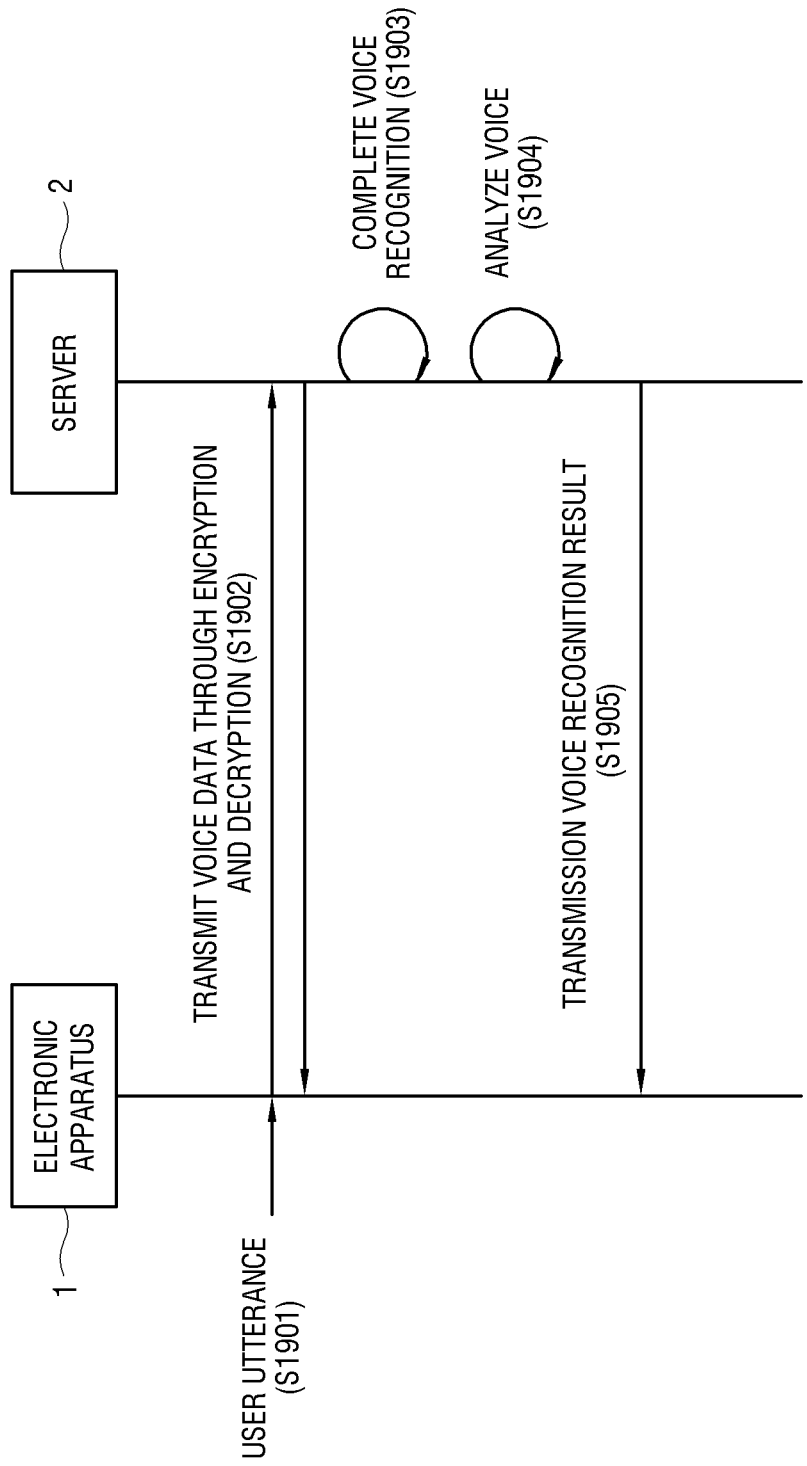
FIG. 19 is a diagram illustrating voice data transmission according to an embodiment of the disclosure.

FIG. 19 is a diagram illustrating voice data transmission according to an embodiment of the disclosure.

FIG. 19 shows operations after voice data transmission between the electronic apparatus 1 and the server 2 is completed. First, it is assumed that the user utters (S1901) and the voice data transmission based on the uttered voice is completed through the encryption and decryption between the electronic apparatus 1 and the server 2 (S1902). The server 2 completes the voice recognition through decryption of the voice data (S1903), analyzes the recognized voice (S1904), and then transmits the voice analysis result to the electronic apparatus 1 (S1905). The processor 180 may perform a corresponding operation based on the received voice analysis result or additionally perform authentication, payment, or the like. For example, when the user utters "pay for movie Titanic" while viewing a content selection menu screen, the uttered voice may be analyzed to perform payment. An embodiment of the disclosure uses the voice data uttered by the user as an authentication key to perform the encryption and decryption of the voice data, and therefore, security may be enhanced and a risk such as payment other than payment for intended content may be made is prevented.

Figure 20:
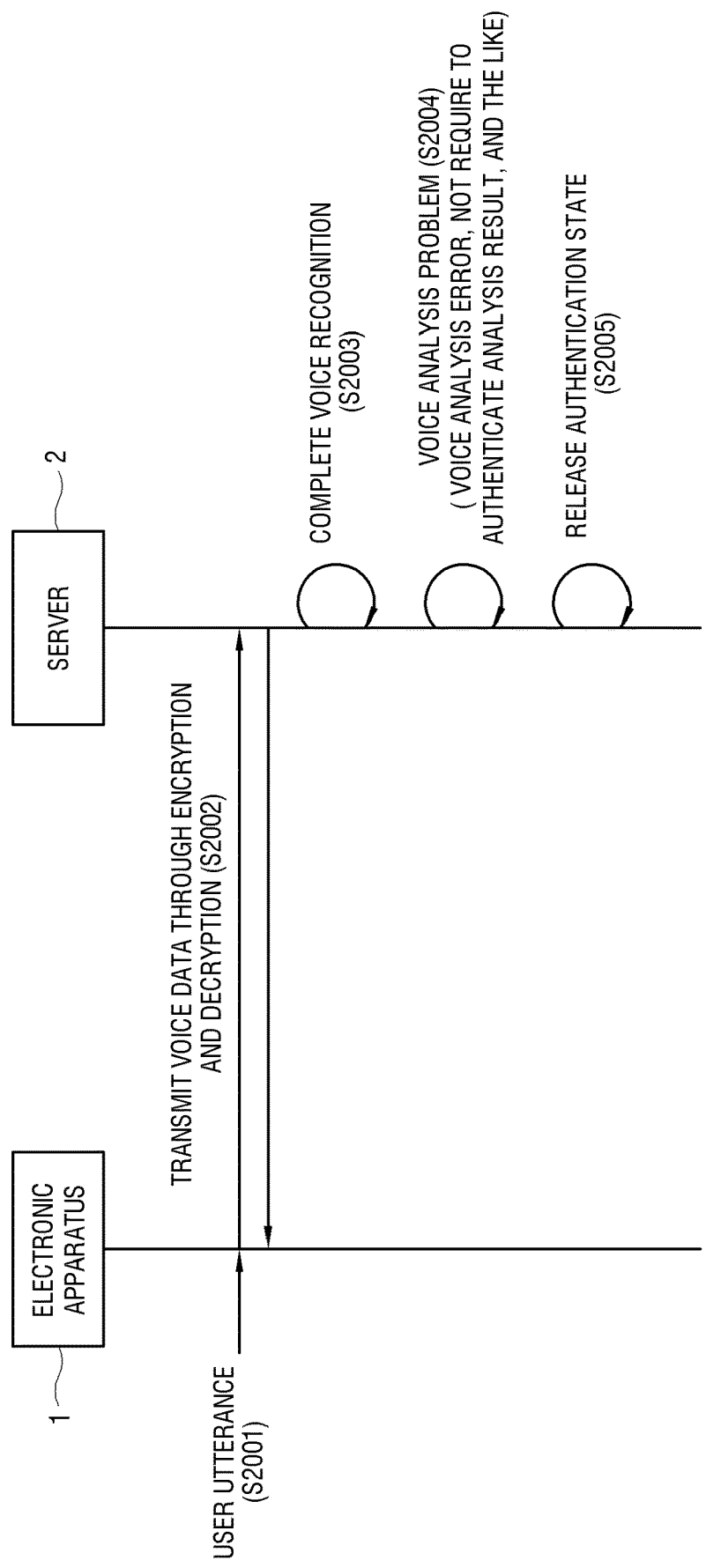
FIG. 20 is a diagram illustrating the voice data transmission according to an embodiment of the disclosure.

FIG. 20 is a diagram illustrating voice data transmission according to an embodiment of the disclosure.

FIG. 20 shows operations after the voice data transmission between the electronic apparatus 1 and the server 2 is completed. First, it is assumed that the user utters (S2001) and the voice data transmission based on the uttered voice is completed through the encryption and decryption between the electronic apparatus 1 and the server 2 (S2002). The server 2 completes the voice recognition through decryption of the voice data (S2003), and if a problem occurs when analyzing the recognized voice (S2004), an authentication state may be released (S2005). Problems that may occur when analyzing the recognized voice may include a voice analysis error, a case where authentication is not required as a result of analysis, or the like. When the authentication status is released, the server 2 transmits information about the release of the authentication status to the electronic apparatus 1. Upon receiving the information about the release of the authentication status, the electronic apparatus 1 may perform an operation such as notifying the user about the release of the authentication status through the display 130.

Figure 21:
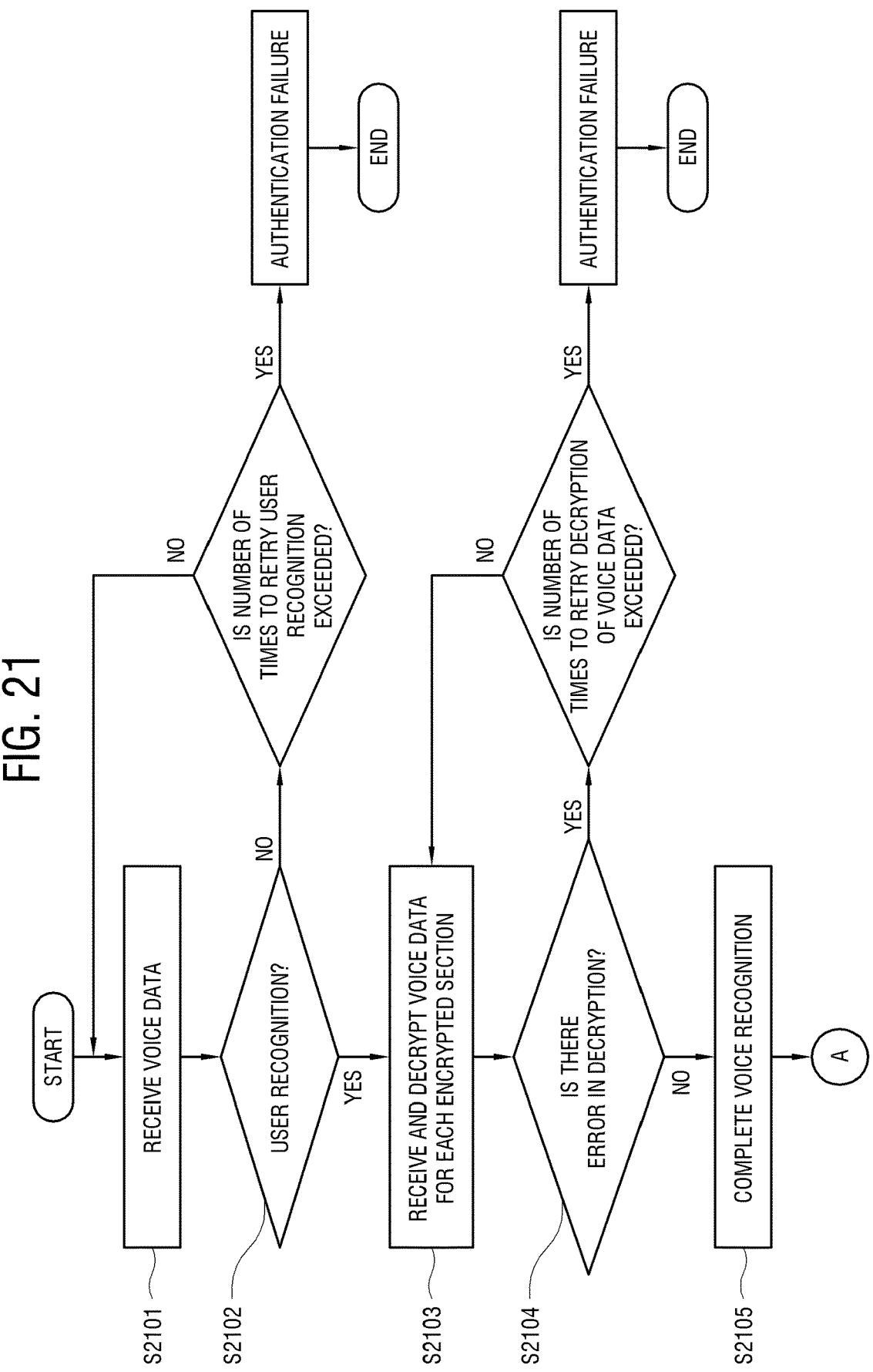
FIGS. 21 and 22 are diagrams illustrating an operation of a server according to an embodiment of the disclosure.
Figure 22:
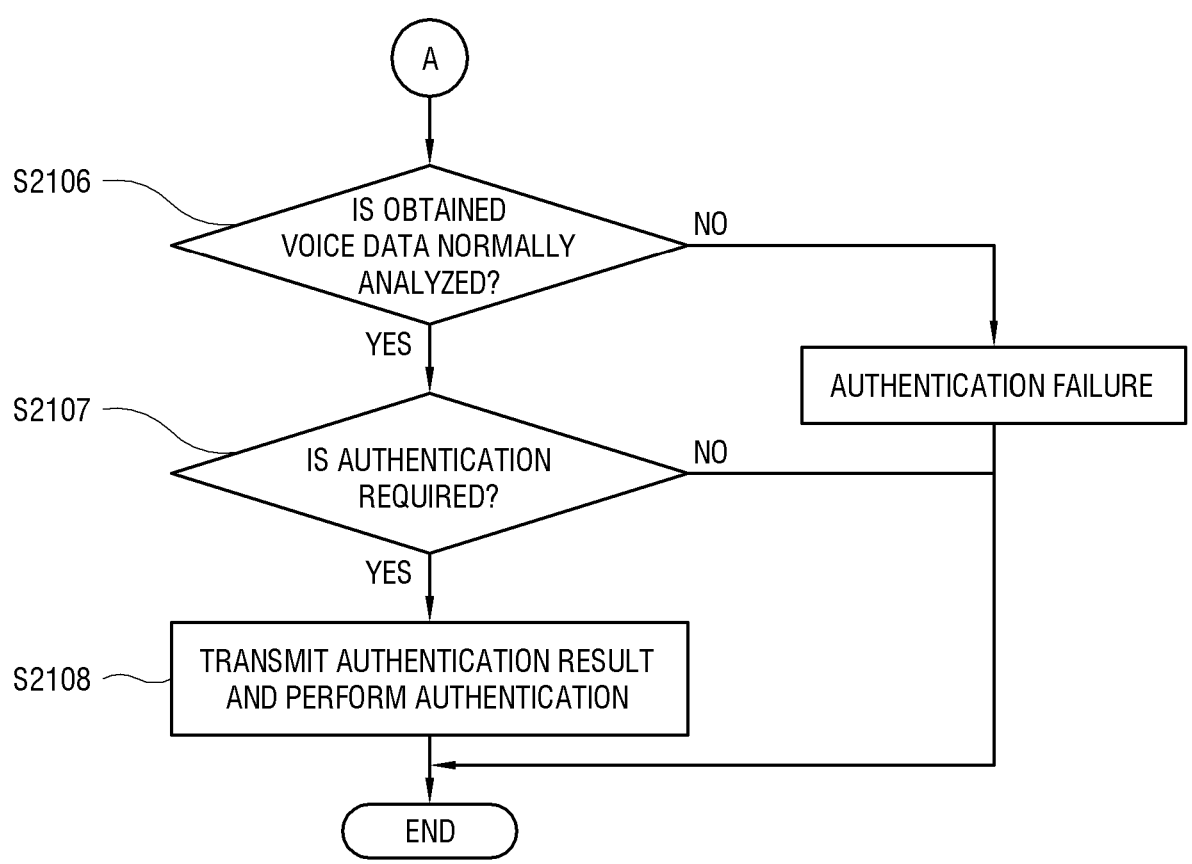

FIGS. 21 and 22 are diagrams illustrating an operation of the server according to an embodiment of the disclosure. When the server 2 receives the voice data (S2101), the server 2 determines whether the user is recognized (S2102). If the user is not recognized ('No' in S2102), it is determined whether a number of times user recognition is retried exceeds a specified number of times, and if the number of times of retrying the user recognition does not exceed the specified number of times ('No'), the process returns to operation S2101 and receives the voice data again. However, if the number of times of retrying the user recognition exceeds the specified number ('Yes'), it is determined that authentication (or user recognition) has failed and the voice data transmission process ends. If the user is recognized ('Yes' in S2102), the server 2 receives the encrypted voice data for each section and decrypts the encrypted voice data (S2103). It is determined whether a decryption error of the received voice data for each section occurs (S2104), and when the decryption error occurs ('Yes' in S2014), it is determined whether a number of times of retrying the decryption of the voice data is exceeded, and if the number of times of retries is not exceeded ('No'), the decryption is retried (S2104). If the number of times of retrying the decryption of the voice data is exceeded ('Yes'), the server 2 determines that authentication (or voice data decryption) has failed and ends the voice data transmission process. If the data decryption for each section is successfully performed ('No' in S2104), the voice recognition is completed (S2105). Then, the server 2 determines whether the obtained voice data is normally analyzed (S2106), and when the normal analysis is not performed ('No' in S2016), it is determined that authentication has failed and the voice data transmission process ends. When the voice data is normally analyzed ('Yes' in S2106), it is determined whether authentication is necessary (S2107), and if it is determined that the authentication is not required ('No' in S2107), the voice data transmission process ends. If it is determined that the authentication is necessary ('Yes' in S2107), the authentication result is transmitted and the authentication is performed (S2108), and as a result, the control or payment according to the voice data may be performed.

Embodiments of the disclosure may be implemented as a non-transitory computer-readable program, and may be realized in general computers that execute the program by using a non-transitory computer-readable recording medium. In addition, the structure of the data used in the above embodiments may be recorded on the non-transitory computer-readable recording medium through various means. The computer-readable medium may include a magnetic storage medium (e.g., a ROM, a floppy disc, a hard disc, etc.), an optical recording medium (e.g., a CD-ROM or a digital versatile disc (DVD)), and a transmission medium, such as an Internet transmission medium.

According to embodiments of the disclosure, an authentication method using a voice data may be performed by using unique characteristics of a user's voice, which is efficient and improves security.

In addition, according to embodiments of the disclosure, when a user inputs a voice, encryption and decryption of voice data corresponding to the input voice is continuously and serially performed between an electronic apparatus and a server, thereby ensuring the integrity of the voice data and preventing hacking through insertion of other voice data during transmission of the voice data.

Further, since a result of processing the transmitted voice data is also used during authentication, the method of using voice according to embodiments of the disclosure may be used for security-critical payment and authentication systems.

In addition, embodiments of the disclosure may be implemented without requiring new or additional modules, and therefore, efficient use of resources is possible.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

Although a few embodiments have been shown and described, it would be appreciated by those skilled in the art that changes may be made in embodiments without departing from the principles and spirit of the disclosure, the scope of which is defined in the claims and their equivalents.

What is claimed is:

1. An electronic apparatus, comprising:
  a communication interface; and
  a processor configured to encrypt data in each of a plurality of sections of voice data, the voice data corresponding to a first user voice input, and control the communication interface to transmit the encrypted data to a server,
  wherein the processor is further configured to:
    obtain a first authentication key based on the encrypted data in a first section of the plurality of sections having been transmitted to the server, and encrypt data in a second section to be transmitted by using the first authentication key based on a data in the first section; and
    obtain a second authentication key based on the encrypted data in a third section of the plurality of sections having been transmitted to the server, and encrypt data in a fourth section to be transmitted by using the second authentication key based on a data in the third section, an interval between the first section and the second section being different from an interval between the third section and the fourth section.

2. The electronic apparatus of claim 1, wherein each of the plurality of sections has a predefined time length.

3. The electronic apparatus of claim 1, wherein the plurality of sections are obtained by dividing the voice data according to at least one of a sentence, a phrase, a word, or a syllable included in the voice data.

4. The electronic apparatus of claim 1, wherein the first section and the second section are adjacent to each other in the voice data.

5. The electronic apparatus of claim 1, wherein the first section and the second section are within a predefined time range.

6. The electronic apparatus of claim 1, wherein the processor is further configured to select the first section from among a plurality of first sections of which encrypted data have been transmitted to the server.

7. The electronic apparatus of claim 1, wherein the processor is further configured to receive information indicating the first section from the server through the communication interface, and
  obtain the first authentication key based on the information indicating the first section.

8. The electronic apparatus of claim 1, wherein the processor is further configured to control the communication interface to transmit, to the server, information indicating the first section based on which the first authentication key is obtained.

9. The electronic apparatus of claim 1, wherein the processor is further configured to control the communication interface to transmit, to the server, second voice data corresponding to a second user voice input, to perform user authentication, and
  encrypt the data in the first section by using a third authentication key that is based on data in a section of the second voice data.

10. The electronic apparatus of claim 1, wherein the processor is further configured to encrypt the data in the second section by using a plurality of authentication keys, the plurality of authentication keys being respectively based on data in a plurality of first sections, encrypted data of the plurality of first sections having been transmitted to the server.

11. A method of controlling an electronic apparatus, comprising:
  receiving a user voice input;
  encrypting data in each of a plurality of sections of voice data corresponding to the user voice input; and
  transmitting the encrypted data to a server,
  wherein the encrypting comprises:
    obtaining a first authentication key based on the encrypted data in a first section having been transmitted to the server, and encrypting data in a second section to be transmitted by using the first authentication key based on a data in the first section; and
    obtaining a second authentication key based on the encrypted data in a third section of the plurality of sections having been transmitted to the server, and encrypting data in a fourth section to be transmitted by using the second authentication key based on a data in the third section, an interval between the first section and the second section being different from an interval between the third section and the fourth section.

12. The method of claim 11, wherein each of the plurality of sections has a predefined time length.

13. The method of claim 11, wherein the plurality of sections are obtained by dividing the voice data according to at least one of a sentence, a phrase, a word, or a syllable included in the voice data.

14. The method of claim 11, wherein the first section and the second section are adjacent to each other in the voice data.

15. A server, comprising:
  a communication interface; and
  a processor configured to:
  receive, from an electronic apparatus via the communication interface, encrypted data in each of a plurality of sections of voice data, the voice data corresponding to a first user voice input;
  decrypt the received encrypted data;
  acquire a result of recognizing the first user voice input based on the decrypted data; and control the communication interface to transmit the acquired result to the electronic apparatus, wherein the processor is further configured to:

obtain a first authentication key based on the encrypted data in a first section of the plurality of sections having been received from the electronic apparatus, and decrypt encrypted data in a second section by using the first authentication key based on data in the first section; and obtain a second authentication key based on the encrypted data in a third section of the plurality of sections having been received from the electronic apparatus, and decrypt encrypted data in a fourth section by using the second authentication key based on data in the third section, an interval between the first section and the second section being different from an interval between the third section and the fourth section.

16. An electronic apparatus, comprising:

a communication interface; and a processor configured to encrypt data in each of a plurality of sections of voice data, the voice data corresponding to a first user voice input, and control the communication interface to transmit the encrypted data to a server, wherein the processor is further configured to:

obtain an authentication key based on data in the encrypted data in a first section of the plurality of sections having been transmitted to the server, and encrypt data in a second section to be transmitted by using the authentication key, wherein the processor is further configured to encrypt the data in the second section by using a plurality of authentication keys, the plurality of authentication keys being respectively based on data in the encrypted data of a plurality of first sections having been transmitted to the server.

* * * * *